US006652371B2

(12) United States Patent
Kamio

(10) Patent No.: US 6,652,371 B2
(45) Date of Patent: Nov. 25, 2003

(54) VENTILATOR

(75) Inventor: Kenichi Kamio, Shizuoka-ken (JP)

(73) Assignee: Nihon Plast Co., Ltd., Shizuo Ka-ken (JP)

( * ) Notice: Subject to any disclaimer, the term of this patent is extended or adjusted under 35 U.S.C. 154(b) by 0 days.

(21) Appl. No.: 10/238,300

(22) Filed: Sep. 9, 2002

(65) Prior Publication Data
US 2003/0050001 A1 Mar. 13, 2003

(30) Foreign Application Priority Data

| Sep. 7, 2001 | (JP) | ............................ P2001-272226 |
| Sep. 26, 2001 | (JP) | ............................ P2001-294436 |

(51) Int. Cl.⁷ ............................................... B60H 1/34
(52) U.S. Cl. ....................................................... 454/155
(58) Field of Search ................................. 454/155, 143, 454/322, 333

(56) References Cited

U.S. PATENT DOCUMENTS

| 2,901,961 A | * | 9/1959 | Cotts ........................... 49/77.1 |
| 4,653,386 A | * | 3/1987 | Hayakawa et al. ........... 454/316 |
| 4,664,023 A | * | 5/1987 | Miyadera et al. ............ 454/322 |
| 4,699,322 A | * | 10/1987 | Jobst ............................ 239/503 |
| 5,080,002 A | * | 1/1992 | Soethout et al. ............. 454/154 |
| 5,120,272 A | * | 6/1992 | Soethout et al. ............. 454/155 |
| 5,338,252 A | * | 8/1994 | Bowler et al. ............... 454/155 |
| 5,433,661 A | * | 7/1995 | Kim ............................ 454/285 |
| 5,470,276 A | * | 11/1995 | Burnell et al. ............... 454/155 |
| 6,129,627 A | * | 10/2000 | Jankowski et al. .......... 454/155 |
| 6,386,967 B1 | * | 5/2002 | Kim ............................ 454/154 |

FOREIGN PATENT DOCUMENTS

JP          04-032650          4/1992

* cited by examiner

*Primary Examiner*—Derek Boles
(74) *Attorney, Agent, or Firm*—Kilpatrick Stockton LLP

(57) ABSTRACT

In a ventilator for adjusting the direction of wind blown out from an air outlet including a case and a plurality of fins, the ventilator has a normal mode which adjusts the direction of the wind blown out from an air outlet by turning the fins in parallel to each other, a specific mode which collects or diffuses the wind blown out from the air outlet by the fins, and a mode selector which continuously selects the normal mode and the specific mode. Thus, selection of the normal mode and the specific mode is easily and continuously performed.

18 Claims, 27 Drawing Sheets

VENTILATOR

BACKGROUND OF THE INVENTION

1. Field of the Invention

The present invention relates to a ventilator for adjusting the direction of wind blown out from an air outlet.

2. Description of the Related Art

There is a conventional technology of this kind of a ventilator described in Japanese Patent No. 2840382. The ventilator in the publication includes an air outlet, a support member and a link. The air outlet is provided with a plurality of turnable louvers which are parallel to each other. The support member is movable in a cross direction. The link is supported by the support member, and is movable in a direction perpendicular to the support member. An interlock shaft projected from the louver is engaged with a guide groove provided in the link. If a knob provided on a central louver is operated in a lateral direction, the direction of a parallel wind blown out from the air outlet can be adjusted in the lateral direction. If a selector is operated vertically, the support member is moved in a back-and-forth direction, and a position of the interlock shaft is adjusted by the guide groove formed in the link. With this operation, a spot air flow mode, a diffusing air flow mode and an ordinal parallel air flow mode can be selected.

SUMMARY OF THE INVENTION

According to the ventilator of the above publication, however, it is necessary to adjust the wind direction using separate operating apparatuses in a normal mode in which the parallel wind blown out from the air outlet is adjusted in a lateral direction, and in a specific mode in which the wind is collected or diffused. Therefore, there are problems in that the operation is troublesome, a structure of the operating apparatus is complicated, and the ventilator becomes expensive.

Further, because the air outlet cannot be fully closed due to the louvers, the wind blown out cannot be cut off completely. There is also a problem that since the air outlet is exposed outside even when the ventilator is not being used, it's appearance is not attractive.

The present invention has been accomplished to resolve the conventional problems. It is an object of the present invention to continuously select the normal mode which adjusts wind direction of the parallel wind and the specific mode which collects or diffuse the wind using a single operating apparatus. It is another object of the invention to provide a ventilator capable of closing the air outlet by means of fins, and to enhance the operatability and the appearance.

The first aspect of the present invention provides a ventilator for adjusting a wind direction having a case, a plurality of fins being operated in a normal mode in which the wind direction is adjusted by turning the fins in parallel to each other, and in a specific mode in which the wind direction is collected or diffused, and a mode selector for continuously selecting the normal mode and the specific mode, wherein the mode selector has a normal operating region and a specific operating region, and the normal mode is performed in the normal operating region and the specific mode is performed in the specific operating region.

According to the first aspect, by operating a region from the normal operating region to the specific operating region by a mode selector, selection of the normal mode and the specific mode is easily and continuously performed. The normal mode can adjust the wind direction of the parallel wind blown out from the air outlet. The specific mode can diffuse the wind blown out from the air outlet and blow the wind toward the passenger, or can collect and blow the wind. Operatability is remarkably enhanced as compared with other conventional operating apparatus in which the normal mode and the specific mode are selected separately.

The second aspect of the present invention provides a ventilator according to the first aspect of the present invention, wherein the specific operating region is provided next to the normal operating region.

According to the second aspect, since it is possible to adjust the wind direction continuously to the specific operating region next to the normal operating region, thus operatability is further enhanced.

The third aspect of the present invention provides a ventilator according to the first aspect of the present invention, wherein the mode selector comprises an operation dial, an intermediate gear which is rotated by the operation of operation dial, and a slide link which is engaged with a cam groove formed on the intermediate gear and is moved in a cross direction, and the slide link is moved from the normal operating region to the specific operating region via the intermediate gear such that the normal mode and the specific mode are continuously selected.

According to the third aspect, it is possible to continuously select the normal mode and the specific mode with a single operation dial. Therefore, as compared with other conventional operating apparatus, operatability is remarkably enhanced. Since the rotation of the operation dial is transmitted to a slide link by a gear, the action of the mode selector becomes smooth, and it is possible to easily select the normal mode and the specific mode by a smaller operation force. Since the mode selector can be constituted by a small number of parts, the apparatus can be formed compactly, thus the size of the ventilator can be reduced. And workability of assembling can be improved.

BRIEF DESCRIPTION OF THE DRAWINGS

The invention will now be described with reference to the accompanying drawings wherein.

DETAILED DESCRIPTION OF THE PREFERRED EMBODIMENTS

Hereinafter, description of embodiments according to the present invention will be made with reference to the drawings.

(Embodiment 1)

Figure 1:
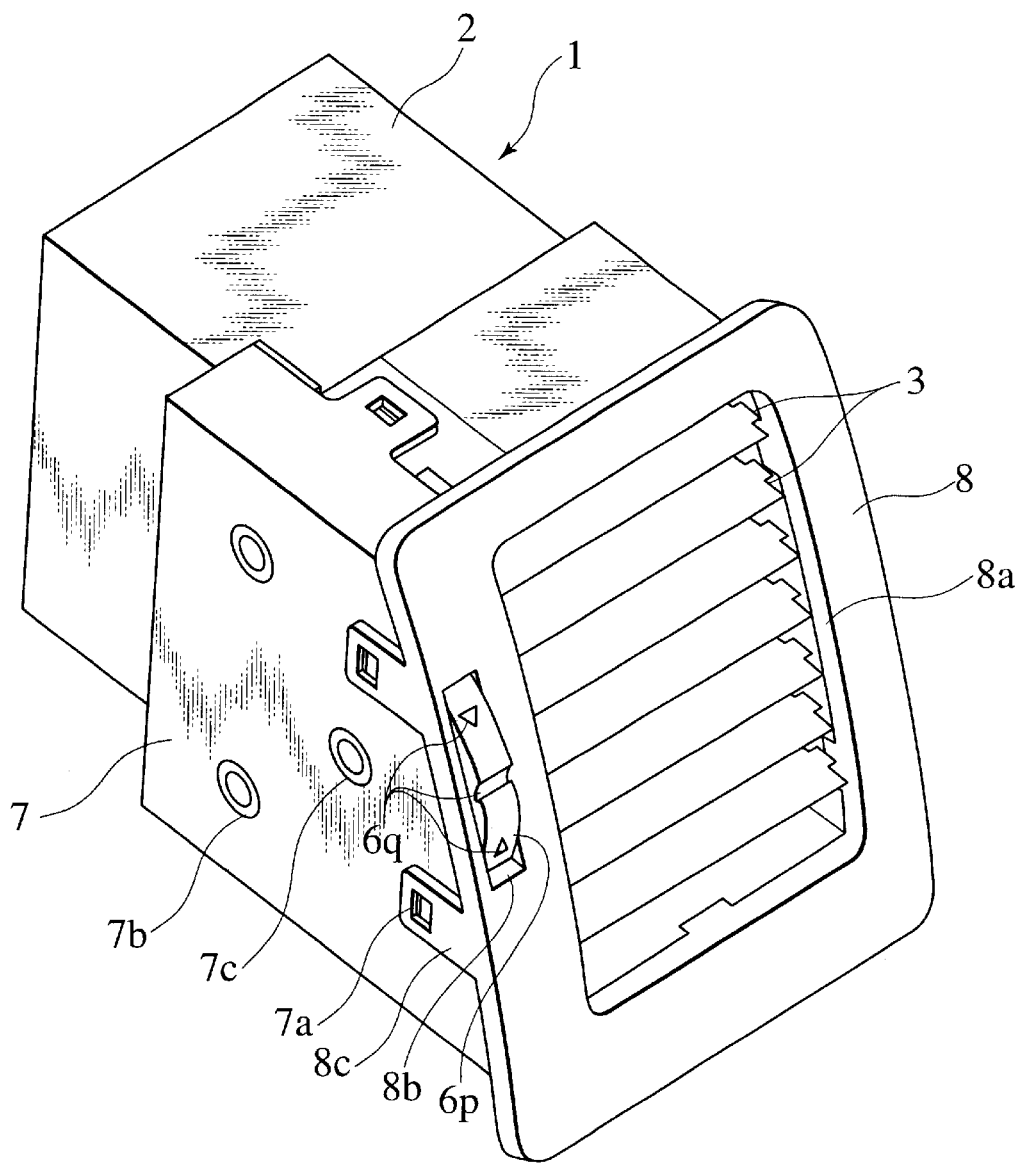
FIG. 1 is a perspective view showing a ventilator of the embodiment 1 of the present invention.
Figure 2:
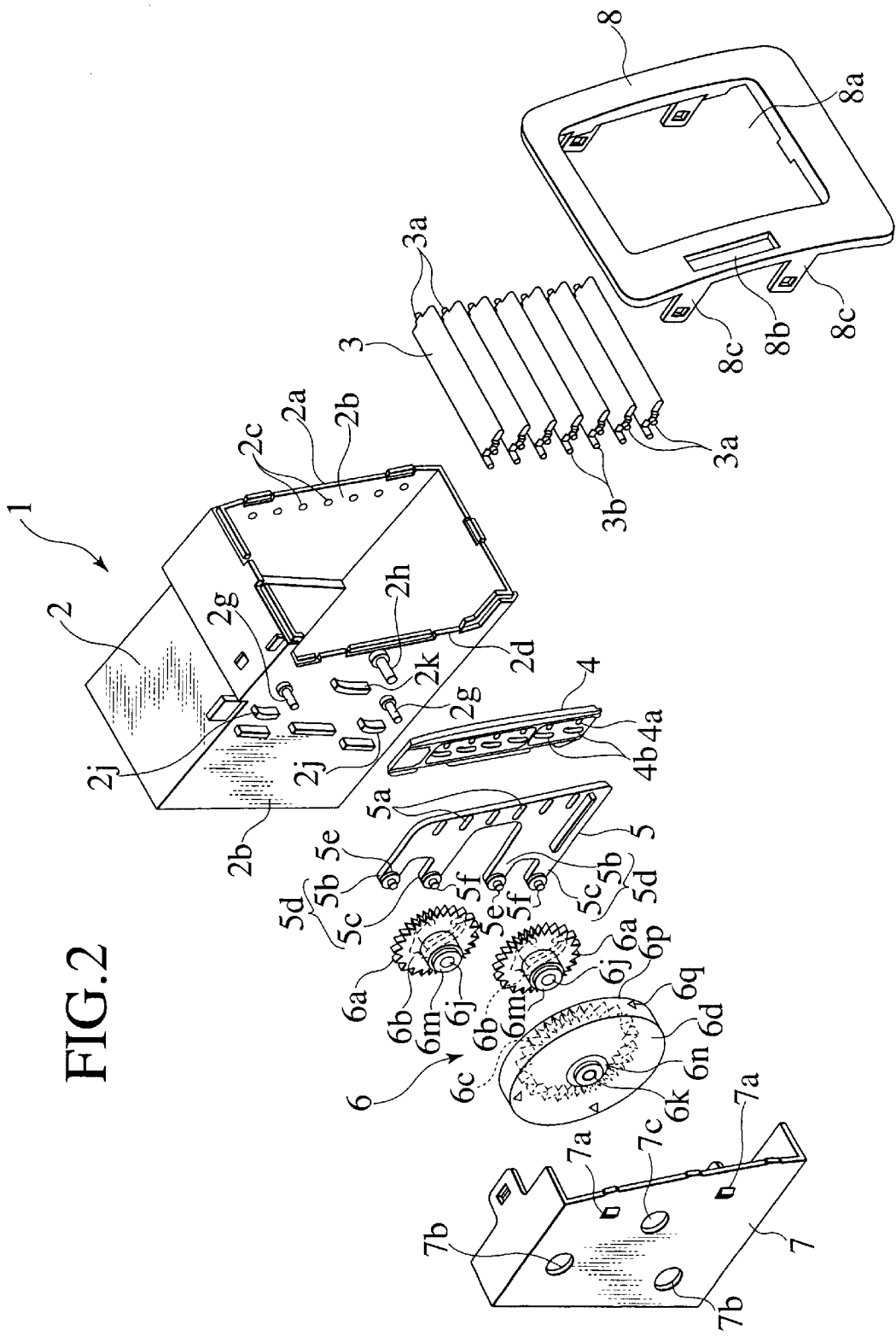
FIG. 2 is an exploded perspective view showing a ventilator of the embodiment 1 of the present invention.

A first embodiment of the present invention will be explained. As shown in FIG. 1 and FIG. 2, a ventilator 1 has a polygonal columnar case 2 whose front face is opened as an opening 2a. The case 2 is mounted inside an air outlet which is opened above an instrument panel for example such that the opening 2a is directed rearward of the vehicle (toward a passenger). In the opening 2a of the case 2, a plurality of fins 3 are horizontally provided at distances from one another in a vertical direction. A shaft pin 3a projected from one end of each fins 3 is rotatably pivoted into a pin hole 2c formed in one of side plates 2b of the case 2.

A shaft pin 3a and a connection pin 3b are projected from the other end of each of the fins 3. The shaft pin 3a is rotatably pivoted into a pin hole 4a of a spacer 4 provided along an opening edge of the other side plate 2b. A finisher 8 is mounted to the opening 2a of the case 2.

The finisher 8 is formed by a plate which is curved in the vertical direction. An opening 8a is formed on a front side of the fins 3, and a side of the opening 8a is formed with a long hole 8b into which an operating portion 6p of the operation dial 6d is projected. With this structure, since the operation dial 6d can be rotated with a finger, operatability is excellent. Retaining pieces 8c are projected from opposite sides of the finisher 8 rearwardly. Tip ends of the retaining pieces 8c are engaged with retaining pawls 7a projected from an outside surface of the cover 7.

The spacer 4 is mounted to the opening edge 2d of the case 2. Arc long holes 4b around the pin holes 4a are formed with respect to the center of the pin holes 4a. The connection pin 3b projected from the other end of the fin 3 passes through the long hole 4b, and is engaged with a guide hole 5a of a slide link 5 provided on the outer side surface of the spacer 4.

Figure 3:
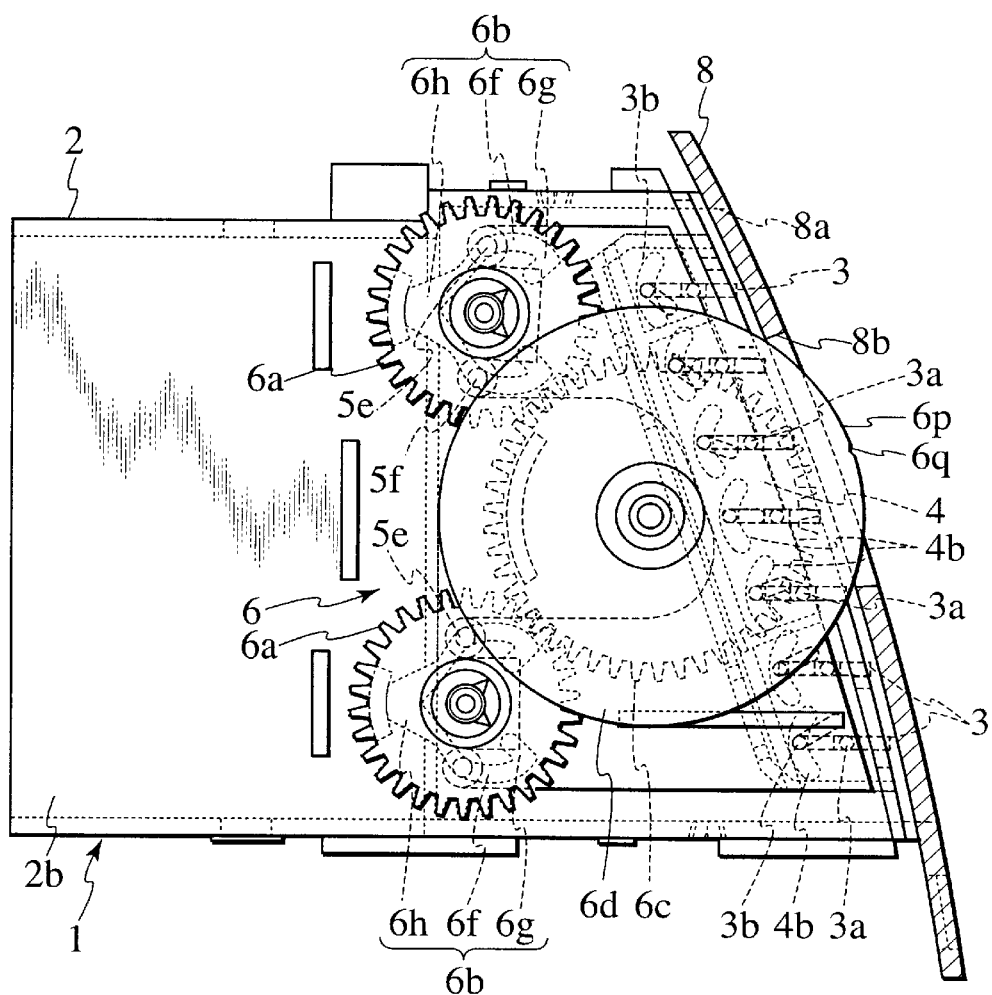
FIG. 3 is a cross-sectional view showing a ventilator of the embodiment 1 of the present invention.

As shown in FIG. 3, the guide hole 5a located at an intermediate portion of the slide link 5 is disposed substantially horizontally, a tip end of the guide hole 5a located above the intermediate portion is inclined downwardly, and a tip end of the guide hole 5a located below the intermediate portion is inclined upwardly. As shown in FIG. 2, projecting portions 5d have branched portions 5b and 5c whose tip end is bifurcated on upper and lower portions of the slide link 5. A pin 5e is projected on a tip end of the branched portion 5b, and a pin 5f is projected on a tip end of the branched portion 5c. The pins 5e and 5f are engaged with cam grooves 6b formed in a pair of intermediate gears 6a constituting a mode selector 6.

The mode selector 6 selects a normal mode which adjusts a wind direction of the parallel wind blown out from the air outlet, and a specific mode which collects or diffuses the wind blown out from the air outlet. The intermediate gear 6a and the operation dial 6d having a pinion 6c which meshes simultaneously with the intermediate gear 6a are accommodated in the cover 7 provided in parallel to the other side plate 2b of the case 2 at a distance therebetween.

As shown in FIG. 3, the intermediate gear 6a is provided such that a surface thereof on which the cam groove 6b is formed is opposed to a side surface of each projecting portion 5d. The cam groove 6b, which is moved the slide link 5 in a cross direction when it is rotated, comprises an arc portion 6f, a bent portion 6g and a merging portion 6h. The arc portions 6f are opposed to each other with respect to a center of the intermediate gear 6a. The bent portion 6g is formed by bending a front end of each of the arc portion 6f toward the center. The merging portion 6h is formed by merging the rear ends of the arc portions 6f, and is of substantially trapezoidal shape.

As shown in FIG. 2 and FIG. 3, a shaft hole 6j of the intermediate gear 6a is rotatably supported by a support shaft 2g projected from an outer side surface of the case 2, and a shaft hole 6k of the operation dial 6d is rotatably supported by a support shaft 2h. A boss portion 6m projected from one of a side surface of the intermediate gear 6a is rotatably pivoted into a circular hole 7b formed in the cover 7, and a boss portion 6n projected from one of a side surface of the operation dial 6d is rotatably pivoted into a circular hole 7c. A front side of an outer peripheral portion of the operation dial 6d is the operating portion 6p. This operating portion 6p is projected from a front surface of the finisher 8 through the long hole 8b formed in the finisher 8. A mark 6q showing an operating position is formed on an outer peripheral surface of the operating portion 6p by a recessed groove and a triangular mark.

Reference numerals 2*j* and 2*k* represent guide ribs projected from one of the side plates 2*b* of the case 2. The guide rib 2*j* guides the intermediate gear 6*a* and the guide rib 2*k* guides the operation dial 6*d* such that they smoothly rotate.

Next, operation of the ventilator having the above-described structure will be explained.

Figure 4:
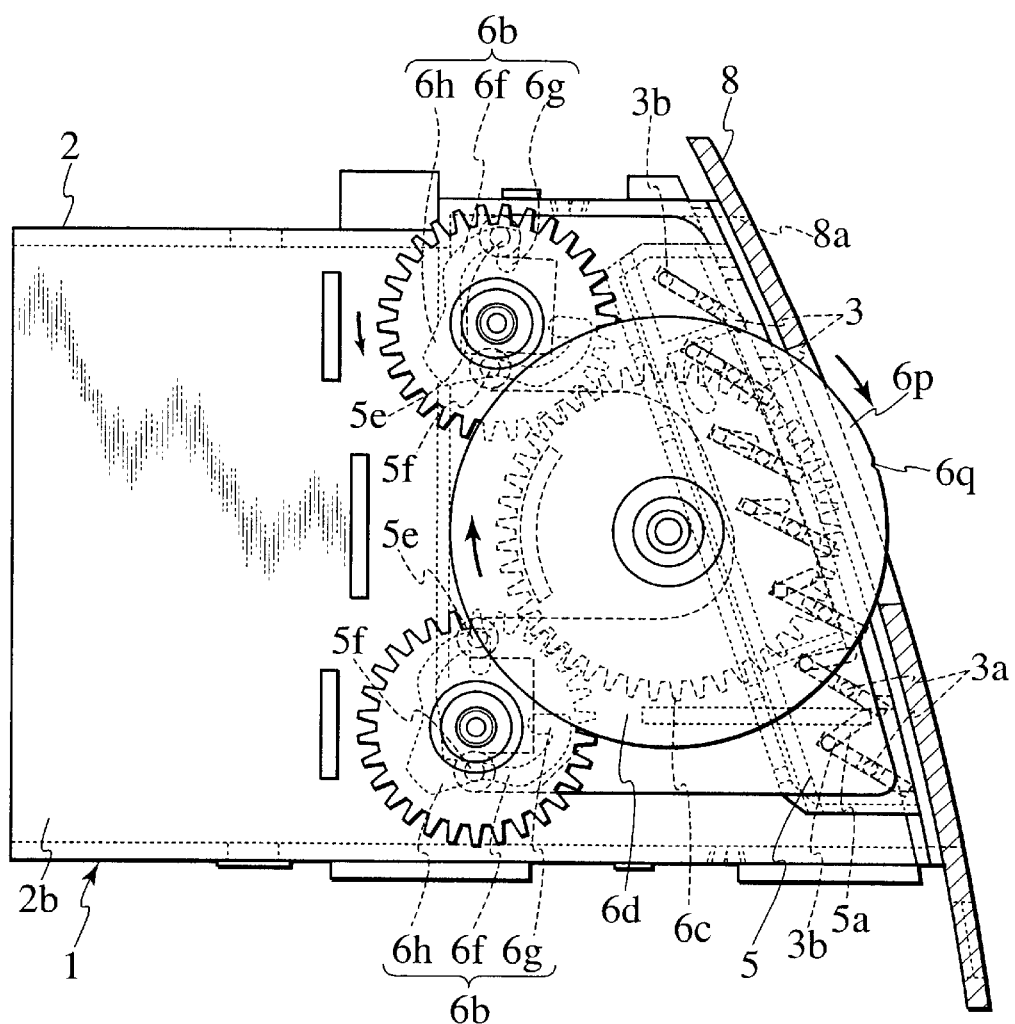
FIG. 4 is a function explanatory view showing a ventilator of the embodiment 1 of the present invention.

When the ventilator is used in the normal mode, the mark 6*q* provided on the operation dial 6*d* of the mode selector 6 is set substantially at a central position of the long hole 8*b*. With this, normal mode is selected as shown in FIG. 3. In this state, the slide link 5 is in the normal operating region which is substantially at an intermediate portion of the back-and-forth ends. The pins 5*e* and 5*f* projected from tip ends of the branched portions 5*b* and 5*c* of the slide link 5 are located on the arc portion 6*f* of the cam groove 6*b*. Since each of the fins 3 are held horizontally, the direction of the wind blown out from the air outlet is adjusted into a horizontal parallel wind by the fins 3. If the blowing direction of the wind is to be adjusted downward from this state, the operating portion 6*p* of the operation dial 6*d* is turned downward. With this, as shown in FIG. 4, the slide link 5 is moved forward, and is moved toward a front end of the normal operating region. The fins 3 connected to the slide link 5 are turned around the shaft pin 3*a* in a clockwise direction via the connection pin 3*b*, and the direction of the wind blown out from the air outlet is adjusted into a downward parallel wind. At that time, the pins 5*e* and 5*f* are still located on the arc portion 6*f* of the cam groove 6*b*.

Figure 5:
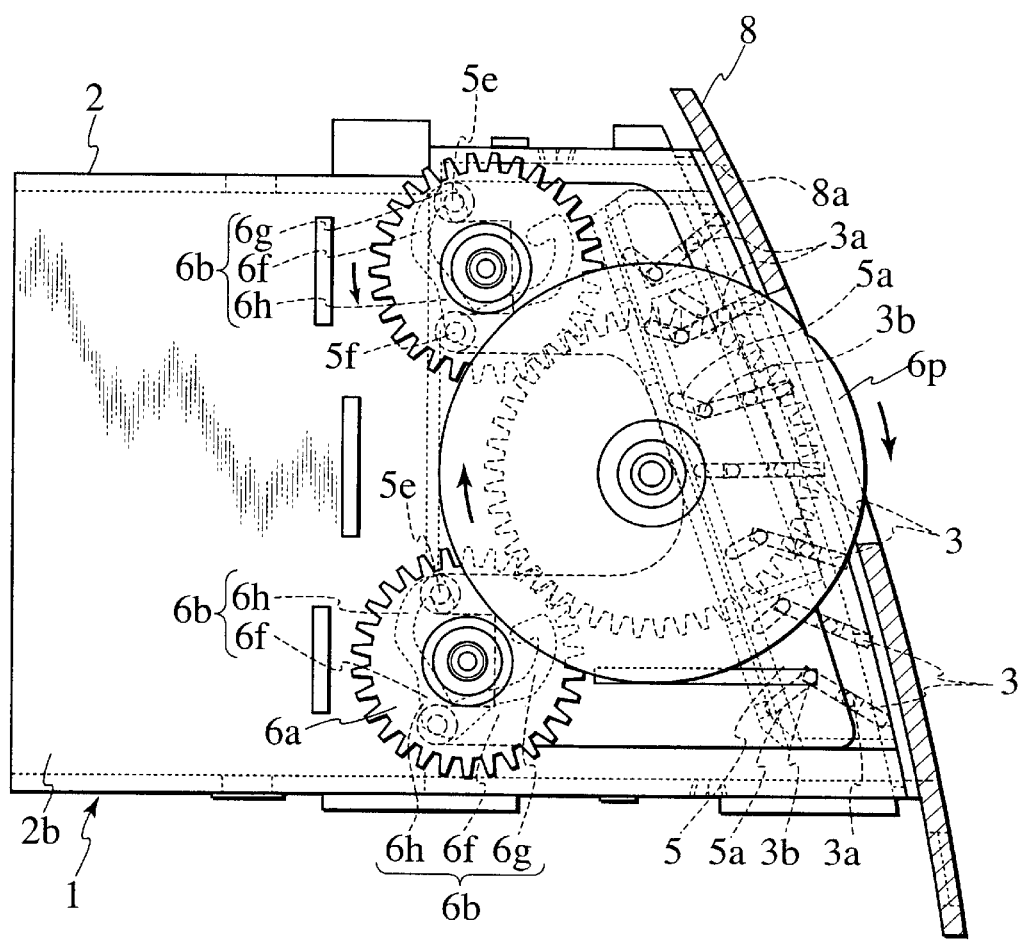
FIG. 5 is a function explanatory view showing a ventilator of the embodiment 1 of the present invention.

When the wind blown out from the air outlet is to be diffused vertically and blown out as shown in FIG. 5, the operating portion 6*p* of the operation dial 6*d* is turned further downward, and the specific mode is selected. With this, the pinion 6*c* provided on the operation dial 6*d* rotates the intermediate gear 6*a* in a counterclockwise direction. Therefore, the pin 5*e* reaches the bent portion 6*g*, and the pin 5*f* reaches the merging portion 6*h* of the cam groove 6*b*. This allows the slide link 5 to exceed the normal operating region and is retreated to the specific operating region. The fins 3 located at an intermediate position are held in a horizontal position by the guide hole 5*a*, the fins 3 located above the intermediate position are turned counterclockwise and oriented upward, and the fins 3 located below the intermediate position are turned clockwise and oriented downward. Thus, the wind blown out from the air outlet is diffused by the fins 3 and blown out toward a passenger.

Figure 6:
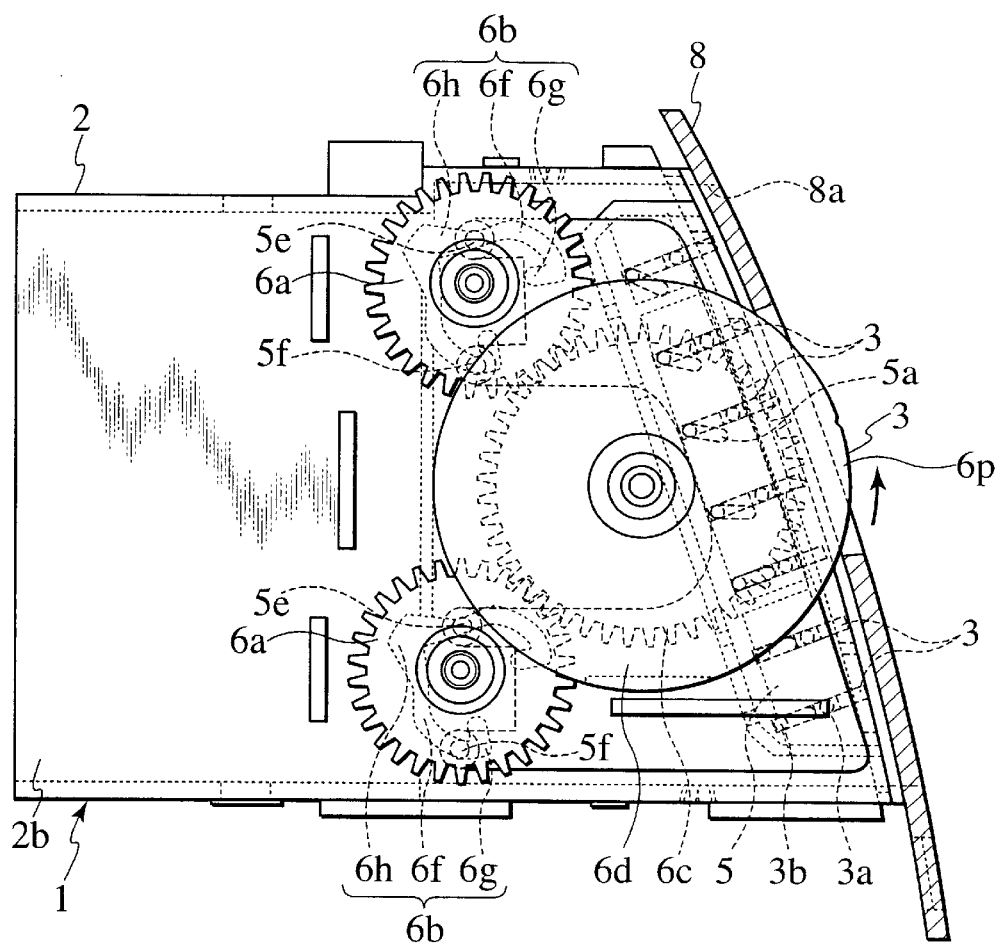
FIG. 6 is a function explanatory view showing a ventilator of the embodiment 1 of the present invention.

On the other hand, when the wind blowing direction is adjusted upward from the normal mode shown in FIG. 3, the operating portion 6*p* of the operation dial 6*d* is turned upward as shown in FIG. 6. With this operation, the slide link 5 is moved to the front end of the normal operating region. Each of the fins 3 connected to the slide link 5 via the connection pin 3*b* are turned counterclockwise around the shaft pin 3*a*, and the wind blown out from the air outlet is adjusted to the upward parallel wind. At that time, the pins 5*e* and 5*f* projected from the tip ends of the branched portions 5*b* and 5*c* are still located on the arc portion 6*f* of the cam groove 6*b*.

Figure 7:
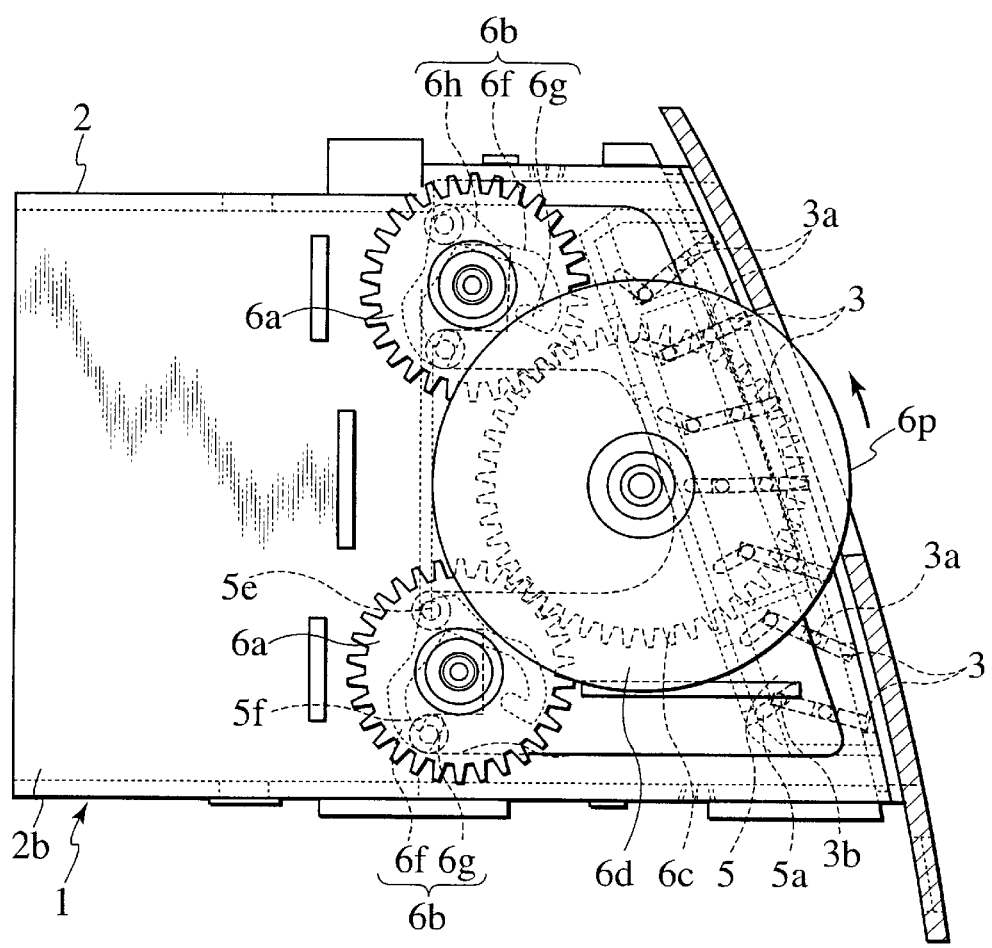
FIG. 7 is a function explanatory view showing a ventilator of the embodiment 1 of the present invention.
Figure 8:
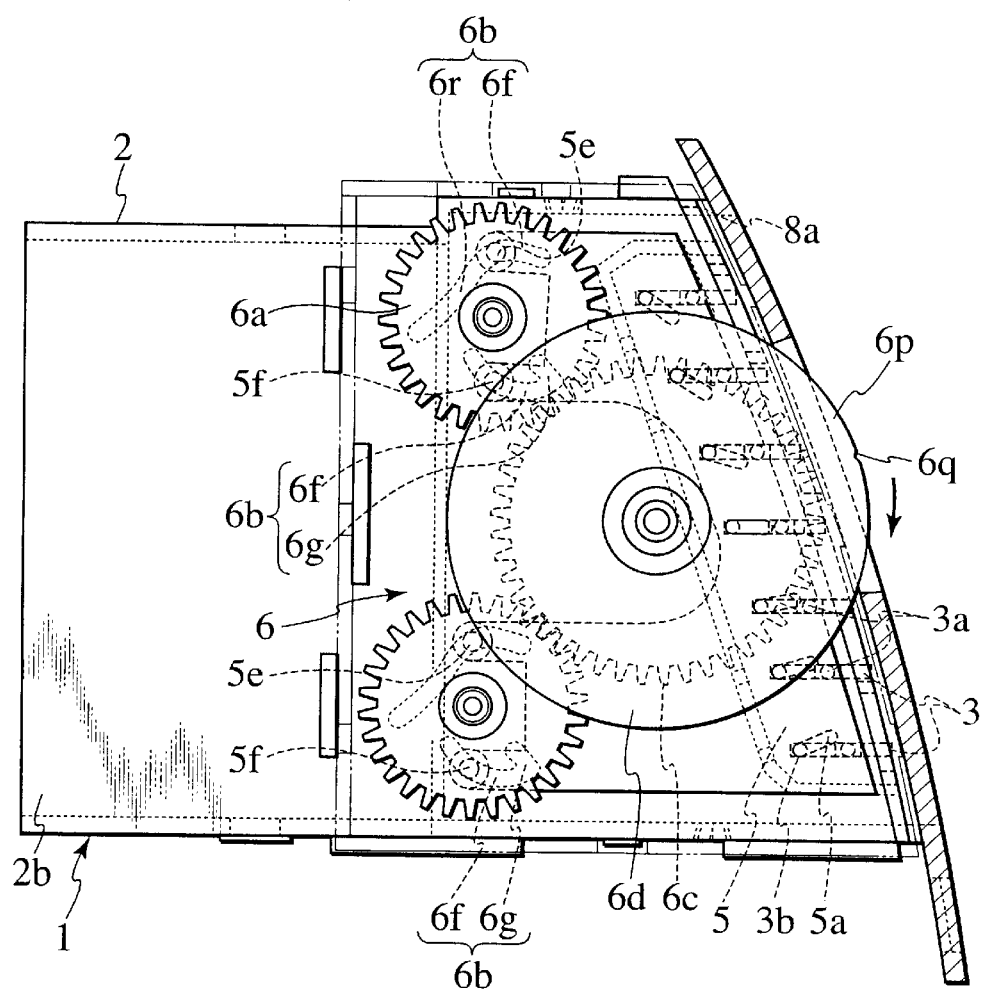
FIG. 8 is a cross-sectional view showing a variational example of a ventilator of the embodiment 1 of the present invention.
Figure 9:
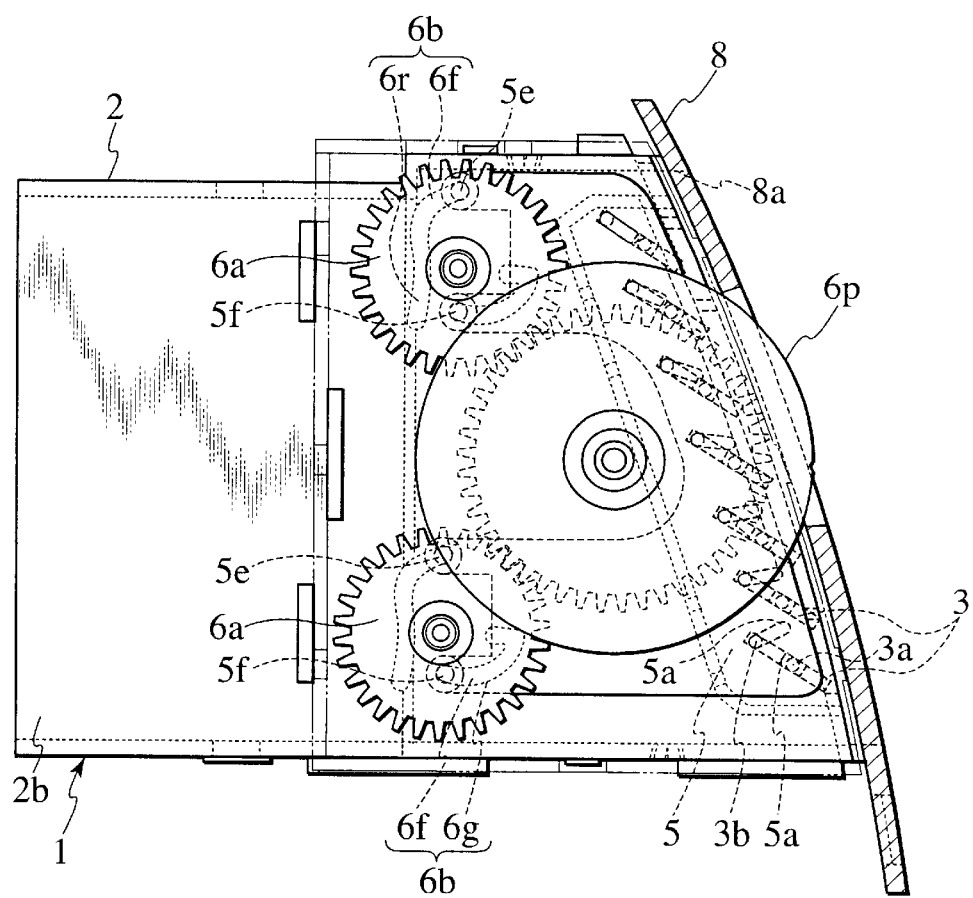
FIG. 9 is a cross-sectional view showing a variational example of a ventilator of the embodiment 1 of the present invention.
Figure 10:
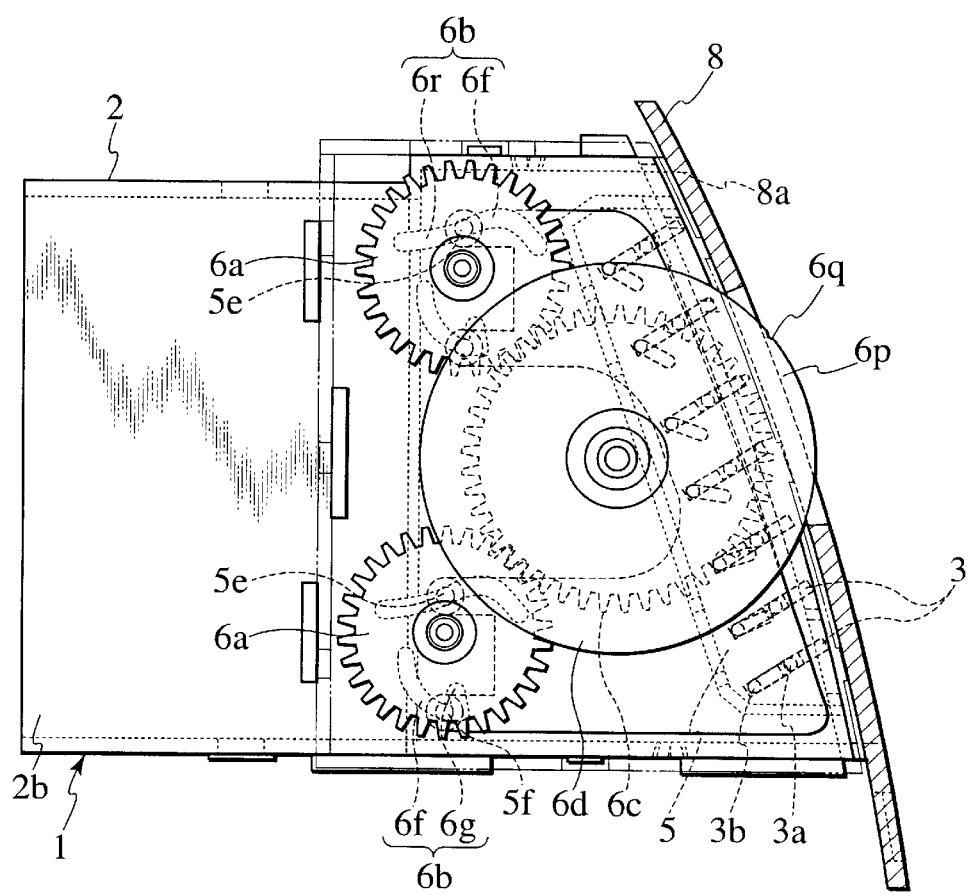
FIG. 10 is a cross-sectional view showing a variational example of a ventilator of the embodiment 1 of the present invention.
Figure 11:
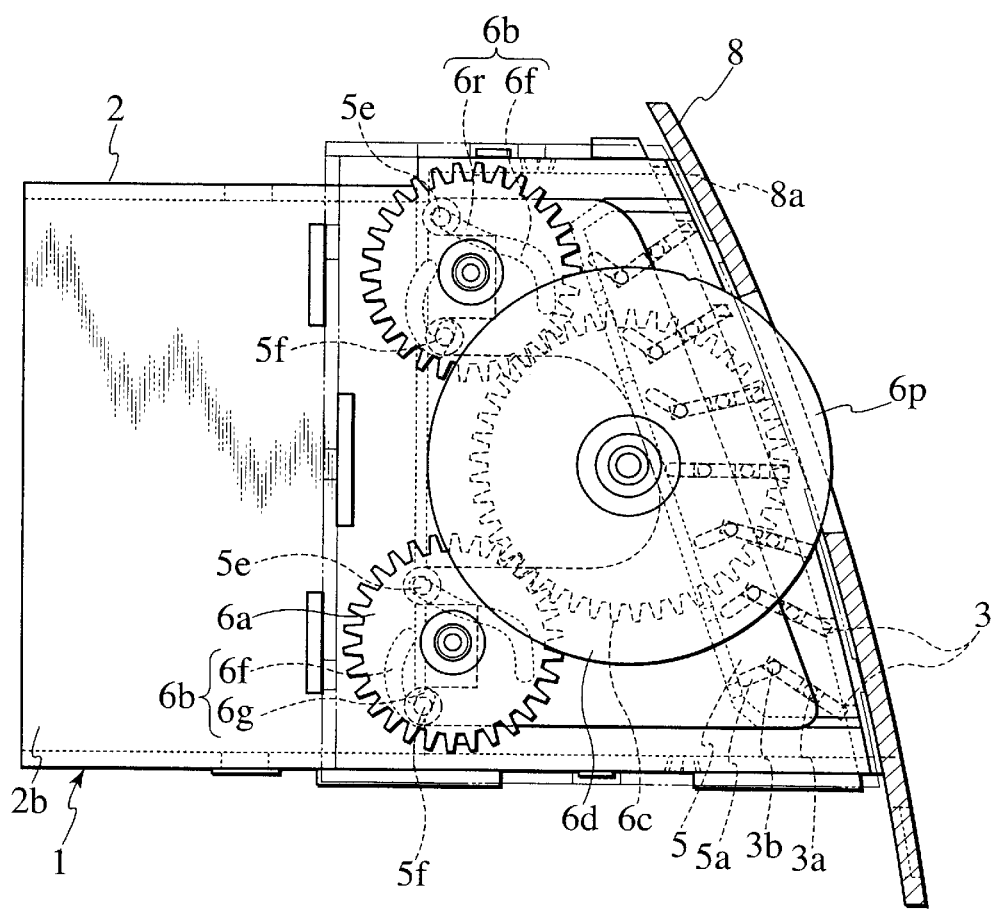
FIG. 11 is a cross-sectional view showing a variational example of a ventilator of the embodiment 1 of the present invention.
Figure 12:
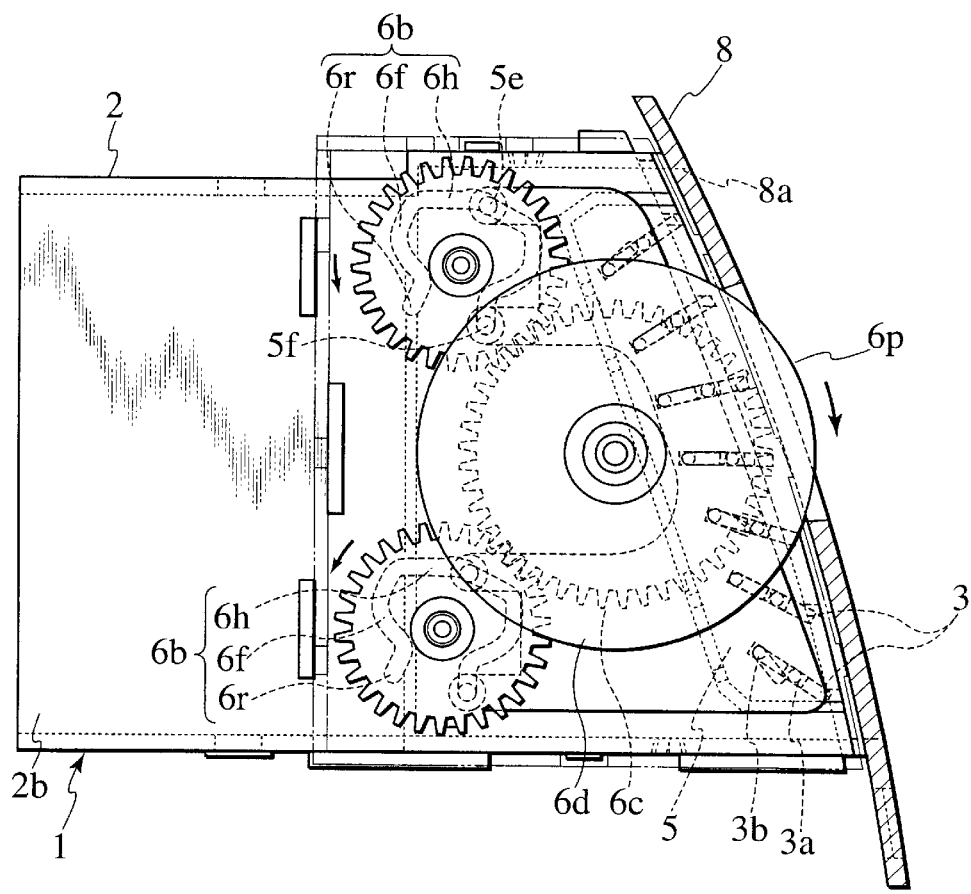
FIG. 12 is a cross-sectional view showing a variational example of a ventilator of the embodiment 1 of the present invention.
Figure 13:
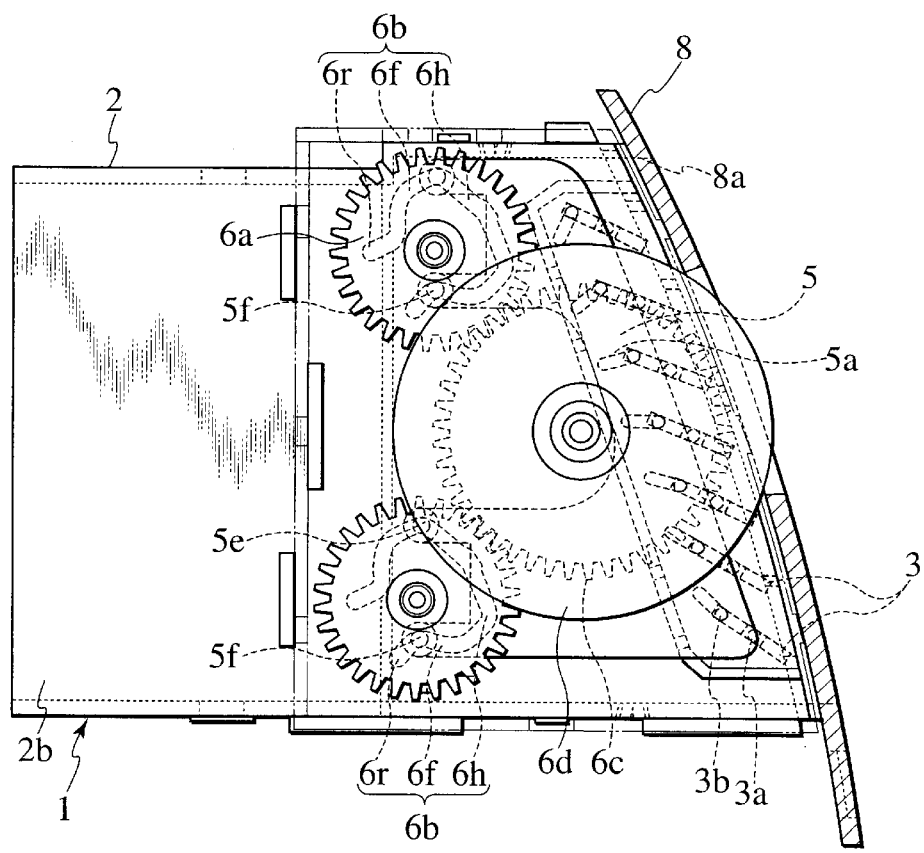
FIG. 13 is a cross-sectional view showing a variational example of a ventilator of the embodiment 1 of the present invention.

When the wind blown out from the air outlet is to be diffused and blown out in a vertical direction as shown in FIG. 7, the operating portion 6*p* of the operation dial 6*d* is further turned upward, and the specific mode is selected. With this, the pinion 6*c* provided on the operation dial 6*d* rotates the intermediate gear 6*a* further in a clockwise direction. Therefore, the pin 5*e* reaches the merging portion 6*h* of the cam groove 6*b*, and the pin 5*f* reaches the bent portion 6*g* of the cam groove 6*b*. This allows the slide link 5 to exceed the normal operating region and retreat to the specific operating region. The fins 3 in the intermediate position are held in a horizontal position by the guide hole 5*a* of the slide link 5, the fins 3 located above the intermediate position are turned counterclockwise and turned upward, and the fins 3 located below the intermediate position are turned clockwise and turned downward. Therefore, the wind blown out from the air outlet is diffused by the fins 3 and blown out toward a passenger.

In the above embodiment, if the specific mode is selected by the mode selector 6, the wind blown out from the air outlet is diffused. However, if the direction of the guide hole 5*a* formed in the slide link 5 is set such that the guide hole 5*a* located at the intermediate position of the slide link 5 is formed substantially horizontally and the guide hole 5*a* located above the intermediate position is formed into a substantially U-shape and the guide hole 5*a* located below the intermediate position is formed into a substantially reversed U-shape and the specific mode is selected, the wind blown out from the air outlet can be collected toward the passenger.

FIG. 8 to FIG. 17 show modifications. Next, these modifications will be explained. The same elements as those in the previous embodiment are designated with the same numerals, and explanation thereof is omitted.

In FIG. 8 to FIG. 13, a shape of the cam groove 6*b* formed on the intermediate gear 6*a* is changed. In a modification shown in FIG. 8 to FIG. 11, the cam groove 6*b* with which the pin 5*e* is engaged is formed into a substantially J-shape having the arc portion 6*f* and a straight portion 6*r*, and the cam groove 6*b* with which the pin 5*f* is engaged is formed by the arc portion 6*f* and the bent portion 6*g*. In a modification shown in FIG. 12 and FIG. 13, the cam grooves 6*b* with which the pins 5*e* and 5*f* are engaged are each formed into substantially J-shapes each having the arc portion 6*f*, the straight portion 6*r*, and the merging portion 6*h* in which front ends of the arc portions 6*f* are connected to each other. In any of these modifications, the effects of the normal mode and the specific mode are the same as those of the previous embodiment, and thus, explanation thereof is omitted.

In modifications shown in FIG. 14 to FIG. 17, the mode selector 6 is formed into a push type apparatus. In any of these modifications, an operation knob 6*s* is used instead of the operation dial 6*d*.

Figure 14:
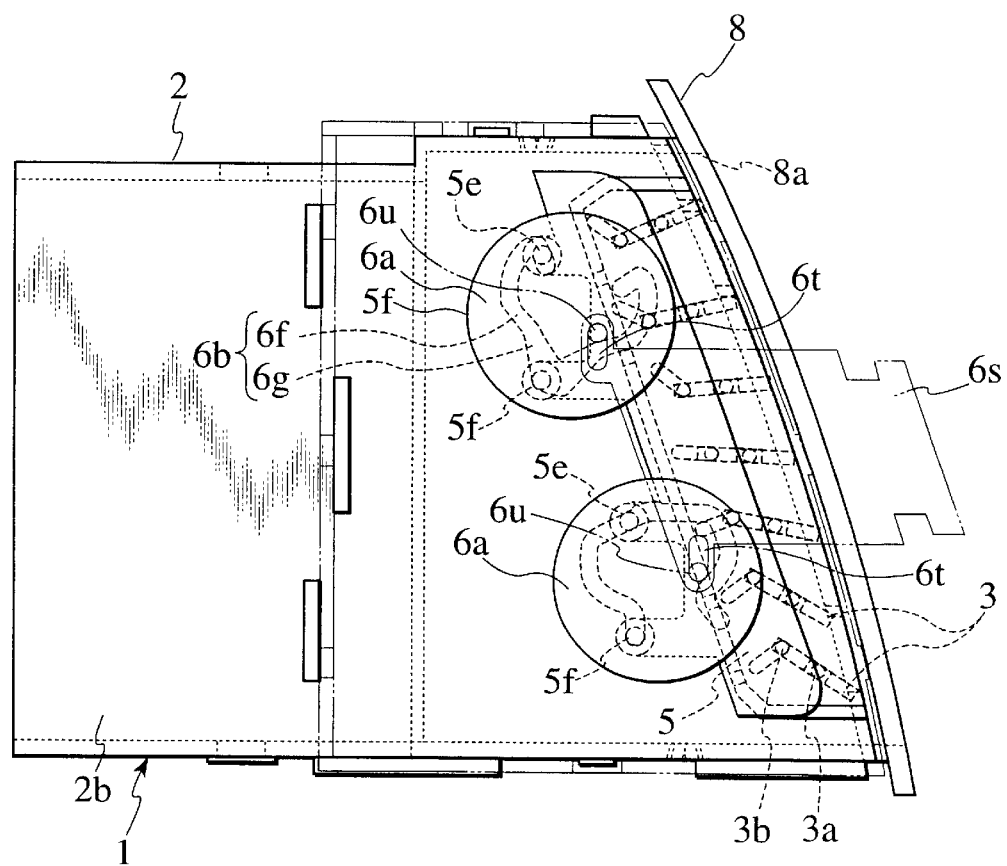
FIG. 14 is a cross-sectional view showing a variational example of a ventilator of the embodiment 1 of the present invention.
Figure 15:
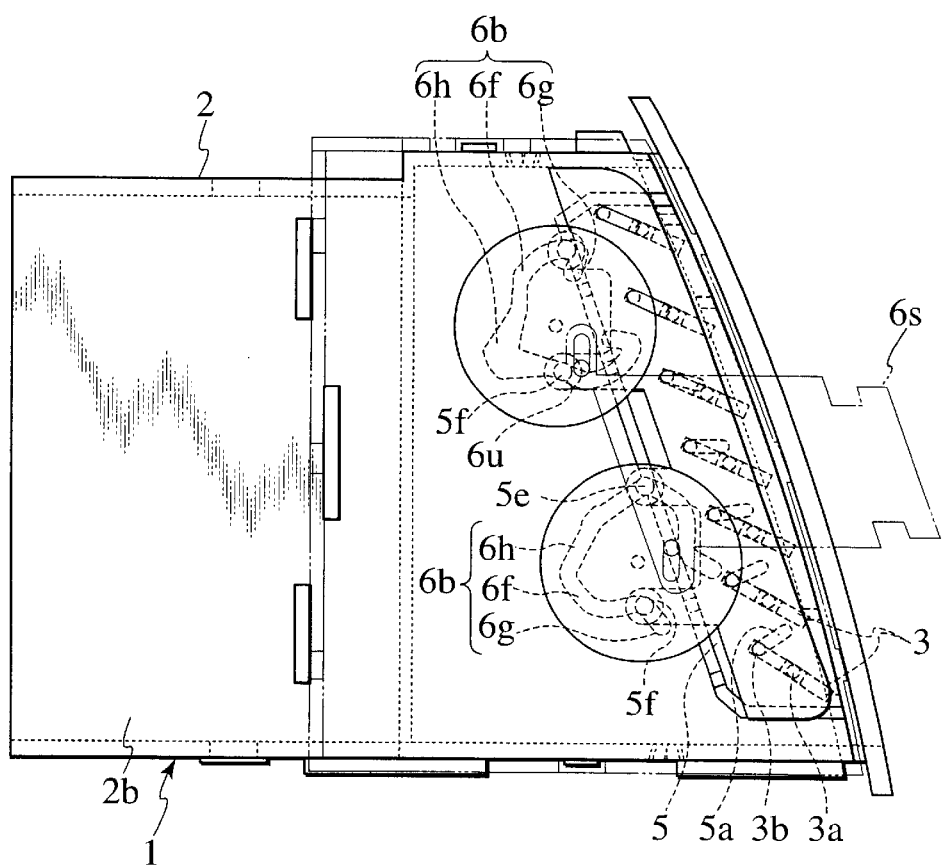
FIG. 15 is a cross-sectional view showing a variational example of a ventilator of the embodiment 1 of the present invention.

In a modification shown in FIG. 14 and FIG. 15, the operation knob 6*s* is supported such that it is movable forward and backward, and guide grooves 6*t* are formed above and below the operation knob 6*s*. Pins 6*u* projected from the intermediate gears 6*a* are engaged with the guide grooves 6*t*. If the operation knob 6*s* is pushed from the specific mode shown in FIG. 14, the intermediate gears 6*a* are rotated in a clockwise direction, and the slide link 5 is moved forward from the specific operating region toward the normal operating region as shown in FIG. 15. With this, the parallel wind blown out from the air outlet is directed into a horizontal direction and can be adjusted downward.

Figure 16:
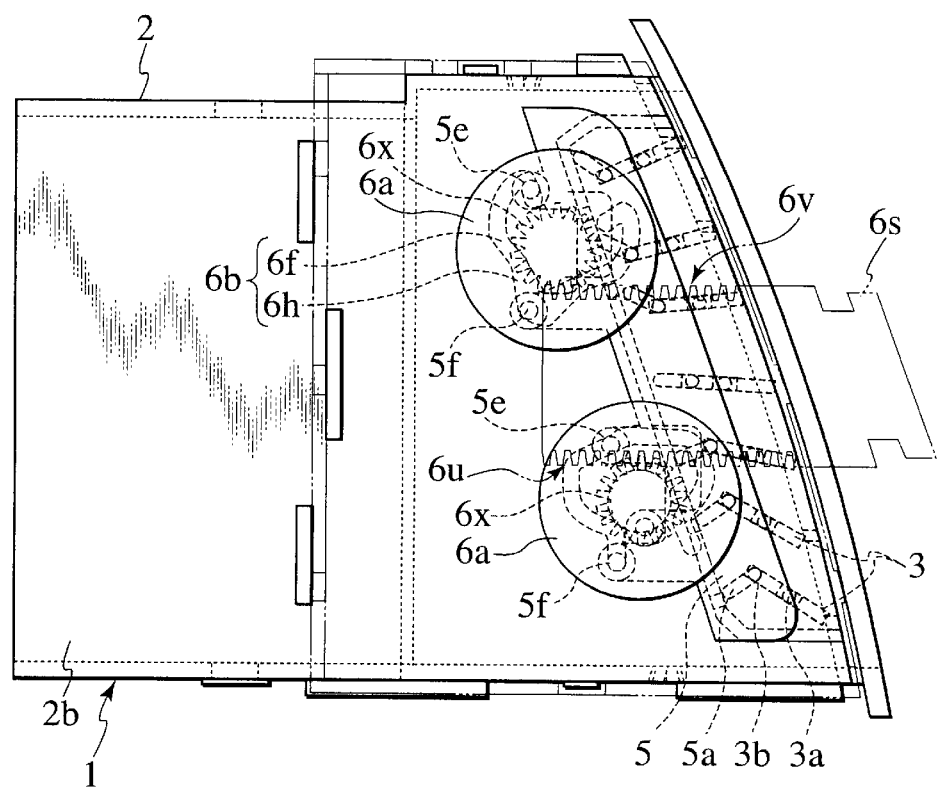
FIG. 16 is a cross-sectional view showing a variational example of a ventilator of the embodiment 1 of the present invention.
Figure 17:
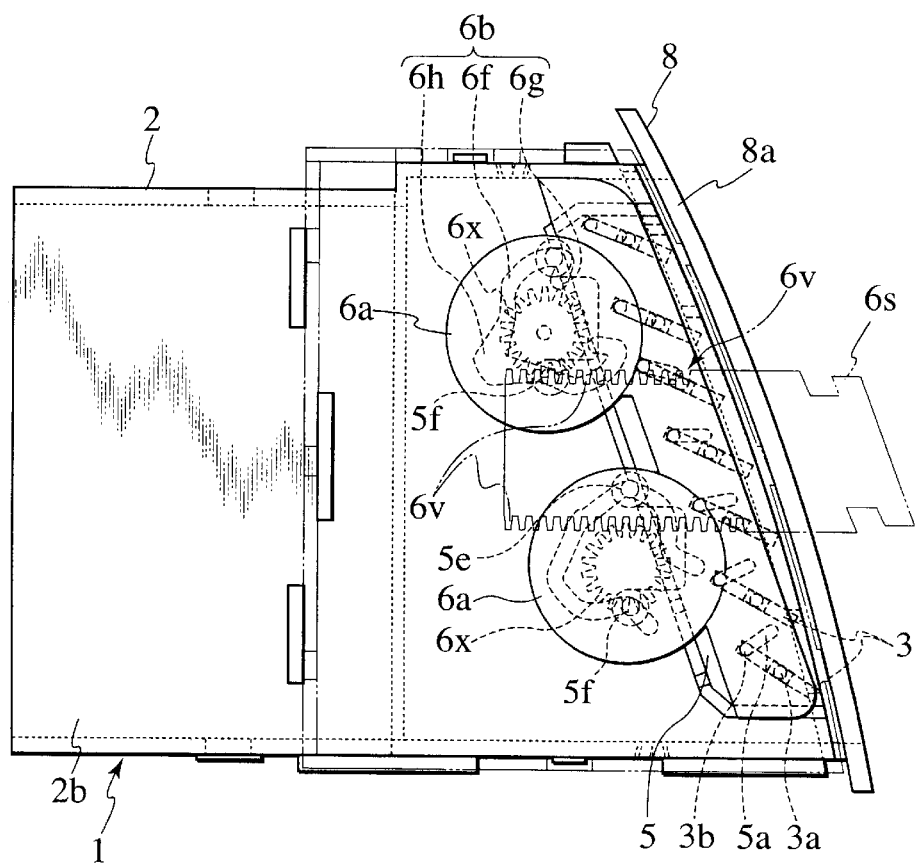
FIG. 17 is a cross-sectional view showing a variational example of a ventilator of the embodiment 1 of the present invention.

In a modification shown in FIG. 16 and FIG. 17, the operation knob 6*s* is supported such that it is movable forward and backward, and racks 6*v* are formed on upper and lower edges of the operation knob 6*s*. Pinions 6*x* formed on the intermediate gears 6*a* are meshed with the racks 6*v*. If the operation knob 6*s* is pushed from the specific mode shown in FIG. 16, the intermediate gears 6*a* are rotated in a clockwise direction and the slide link 5 is moved forward from the specific operating region toward the normal operating region as shown in FIG. 17. Therefore, the parallel wind blown out from the air outlet is turned into a horizontal direction and can be adjusted downward.

Although the operation knob 6s is operated in a cross direction in each of the modifications in FIG. 14 to FIG. 17, the normal mode and the specific mode may be selected by operating the operation knob 6s in the vertical direction.

If the specific mode is selected in the above embodiment and the modifications, the fins 3 located above the intermediate position are turned upward, and the fins 3 located below the intermediate position are turned downward. However, the following structure may also be employed. That is, the specific operating region is provided at only one side of the normal operating region so that the fins 3 can be operated to the specific operating region continuously with the normal operating region when the fins 3 are moved upward in the normal operating region, and only the upper direction of the instrument panel may be set as a wind direction adjusting mode. In this case, the fins 3 may be along the opening 8a of the finisher 8 in the lower direction of the instrument panel, and a lower half of the opening 8a may be fully closed visually.

(Embodiment 2)

Figure 18:
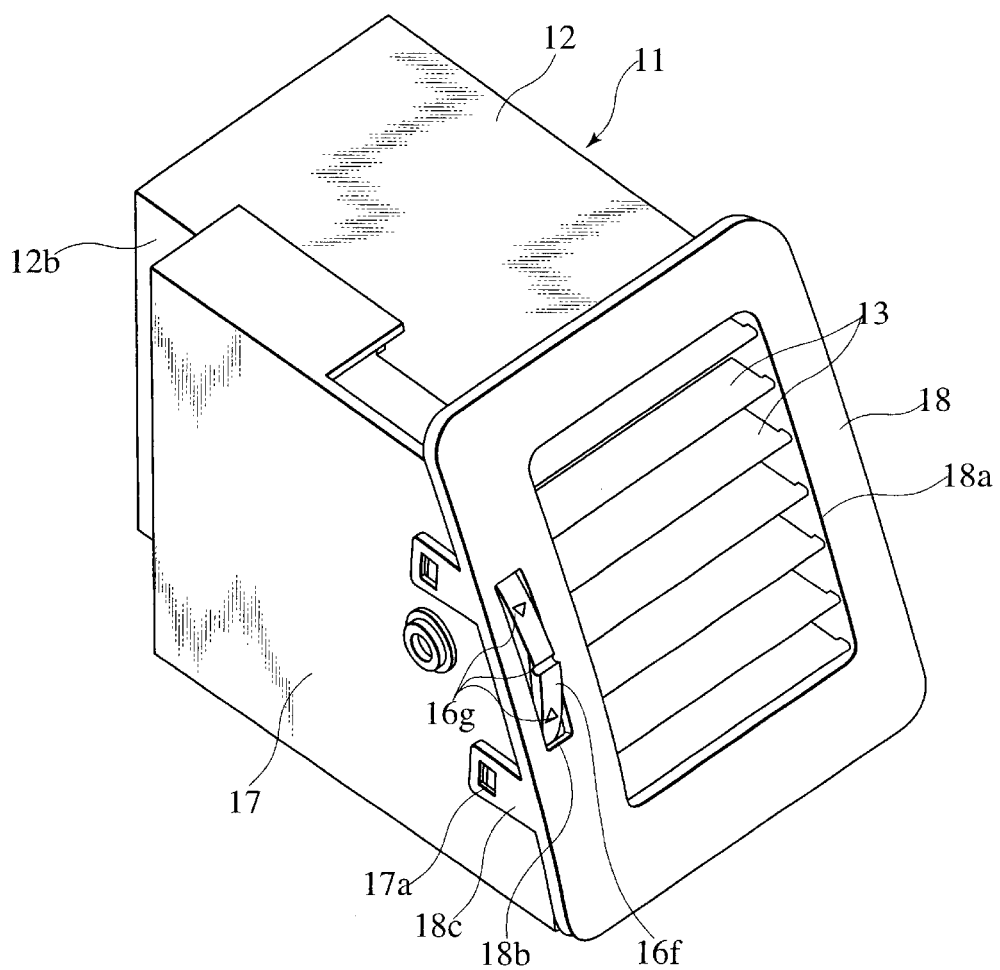
FIG. 18 is a perspective view showing a ventilator of the embodiment 2 of the present invention.
Figure 19:
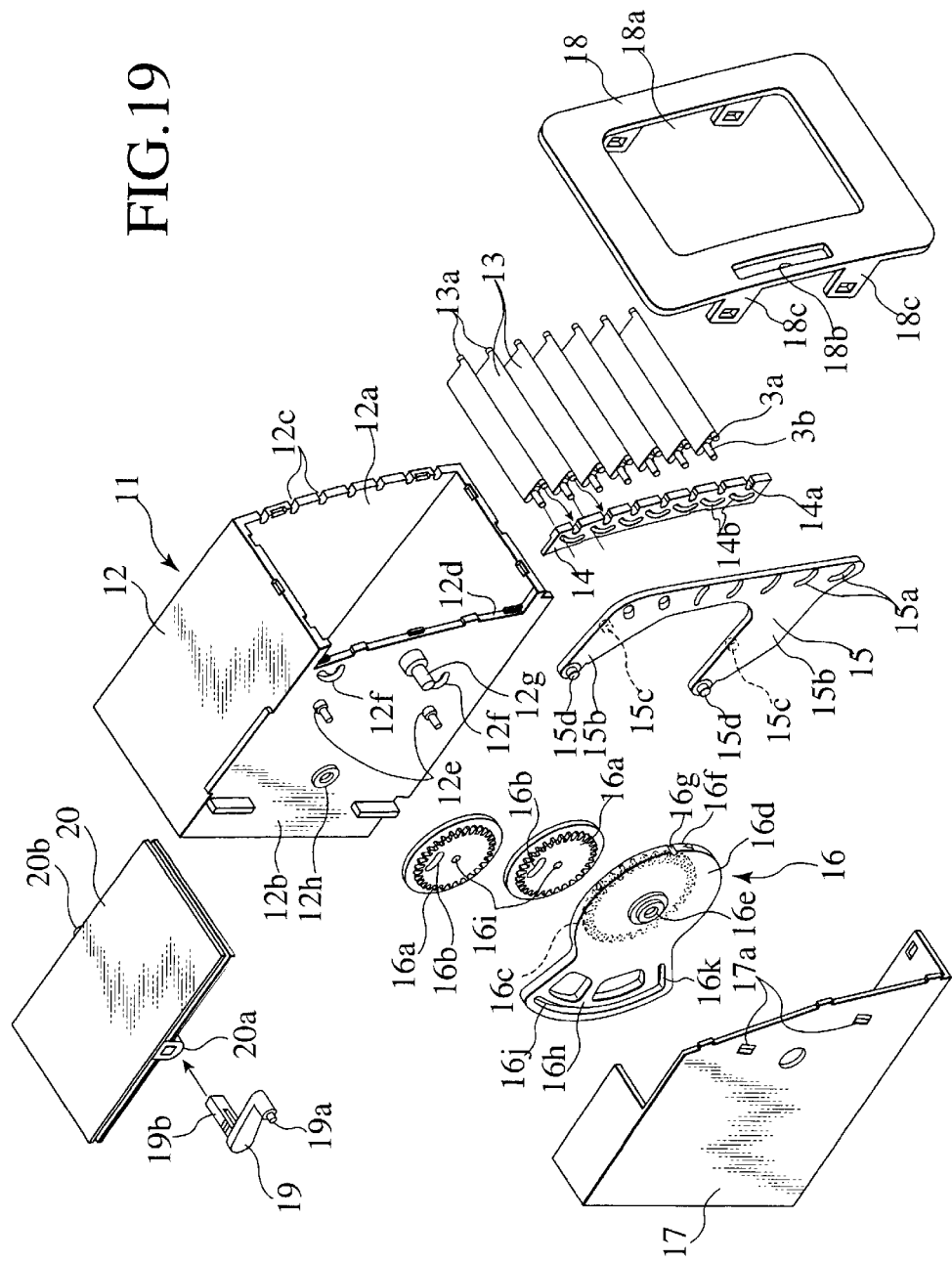
FIG. 19 is an exploded perspective view showing a ventilator of the embodiment 2 of the present invention.

A second embodiment of the present invention will be explained. As shown in FIG. 18 and FIG. 19, a ventilator 11 has a polygonal columnar case 12 whose front face is opened as an opening 12a. The case 12 is mounted inside the air outlet which is opened above an instrument panel for example such that the opening 12a is directed rearward of the vehicle (toward a passenger).

In the opening 12a of the case 12, a plurality of fins 13 are horizontally provided at distances from one another in a vertical direction. A shaft pin 13a projected from one end of each fin 13 is rotatably pivoted into a notched pin receiver 12c formed on one of side plates 12b of the case 12.

A shaft pin 13a and a connection pin 13b are projected from the other end of each of the fins 13. The shaft pin 13a is rotatably pivoted into a pin receiver 14a of a spacer 14 provided along an opening edge of the other side plate 12b. The shaft pins 13a are not pulled out from the receivers 12c and 14a by means of a finisher 18 which abuts against the opening 12a.

The finisher 18 is formed by a plate which is curved in the vertical direction. A long hole 18b, into which an operating portion 16f of a later-described operation dial 16d is projected, is formed on a side of the opening 18a. Retaining pieces 18c projected rearward are provided on opposite sides of the finisher 18. Tip ends of the retaining pieces 18c are engaged with retaining pawls 17a projected from one of outer side surface of the case 12 and outer side surface of the cover 17.

As shown in FIG. 19, a spacer 14 is fitted to an opening edge 12d of the case 12. Arc long holes 14b curved around pin receivers 14a are formed with respect to a center of the pin receivers 14a. A connection pin 13b is projected from the other end of each of the fins 13. The connection pin 13b passes through the long hole 14b and is pivoted into a guide hole 15a of the slide link 15 provided on an outer side surface of the spacer 14.

Figure 20:
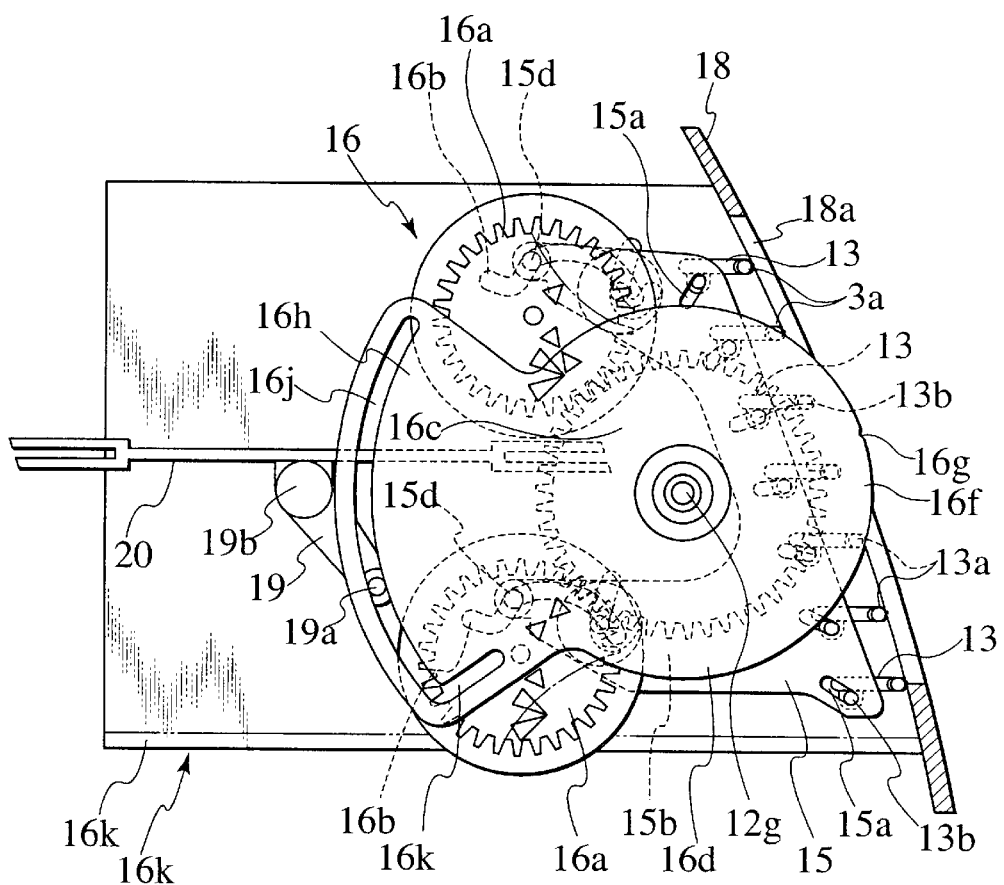
FIG. 20 is a cross-sectional view showing a ventilator of the embodiment 2 of the present invention.

As shown in FIG. 20, the guide holes 15a are formed such that the guide holes 15a located on the intermediate position of the slide link 15 are formed to be substantially horizontal, the guide holes 15a located above the intermediate position are formed into a substantially reversed U-shape, and the guide holes 15a located below the intermediate position are formed into a substantially U-shape. Projecting portions 15b extending rearward are projected from upper and lower portions of the slide link 15. Pins 15c are provided at a base end of each of the projecting portion 15b, and Pins 15d are provided at a tip end of each of the projecting portion 15b.

The pins 15c are engaged with a substantially C-shaped groove 12f formed in the side plate 12b. The pins 15d are engaged with substantially falcated cam grooves 16b respectively formed in a pair of intermediate gears 16a constituting a mode selector 16.

The mode selector 16 selects a normal mode which adjusts a direction of the wind blown out from an air outlet and a specific mode which collects or diffuses the wind blown out from the air outlet. The intermediate gear 16a and the operation dial 16d having a pinion 16c which meshes with the intermediate gear 16a are at the same time accommodated in the cover 17 provided in parallel to the other side plate 12a of the case 12 at a distance from each other.

As shown in FIG. 19 and FIG. 20, a shaft hole 16e is formed in a central portion of the operation dial 16d. The shaft hole 16e is rotatably supported by a support shaft 12g which projects from an outer side surface of the case 12. An operating portion 16f is formed on a front side of the outer peripheral portion of the operation dial 16d. The operating portion 16f is projected from the long hole 18b formed in the finisher 18. A mark 16g showing an operating position is formed on an outer peripheral surface of the operating portion 16f by a recessed groove and a triangular mark. A shaft hole 16i formed in a central portion of the intermediate gear 16a is rotatably supported by the support shaft 12e projected from the outer surface of the case 12.

A substantially fan-like cam 16h is projected from a rear side of the outer peripheral portion of the operation dial 16d, and an arc cam groove 16j is formed along the outer peripheral surface of the cam 16h. A lower end of the cam groove 16j is bent toward a center of the operation dial 16d, and a bent portion 16k is formed. A pin 19a projected from a tip end of a shutter opening and closing lever 19 is engaged with the cam groove 16j.

A polygonal columnar shaft rod 19b is projected from a base end of the shutter opening and closing lever 19 in the opposite direction of the pin 19a. The shaft rod 19b is projected into the case 12 from a bearing hole 12h formed in the side plate 12b, and the shaft rod 19b is engaged with a shaft hole 20a of a shutter valve 20 provided in the case 12.

The shutter valve 20 is formed by a plate having a size capable of rotating in the case 12. The shutter valve 20 is rotatably supported by a shaft pin 20b projected from the opposite side of the shaft hole 20a and a side plate 12b of the case 12. A sealing member (not shown) which abuts against an inner surface of the case 12 to prevent the wind from leaking when the shutter valve 20 is closed is provided to opposite ends of the shutter valve 20.

Next, operation of the ventilator having the above structure will be explained.

When the ventilator is used in the normal mode, the mark 16g is set to a substantially central portion of the long hole 18b as shown in FIG. 20, thereby selecting the normal mode. With this, the slide link 15 is retreated, and it is moved to a rear end of the normal operating region. The pin 15d is located on a connecting portion between the arc portion and the bent portion of the cam groove 16b. Since each of the fins 13 are held horizontally, the direction of the wind blown out from the air outlet is adjusted to the horizontal parallel wind.

Figure 21:
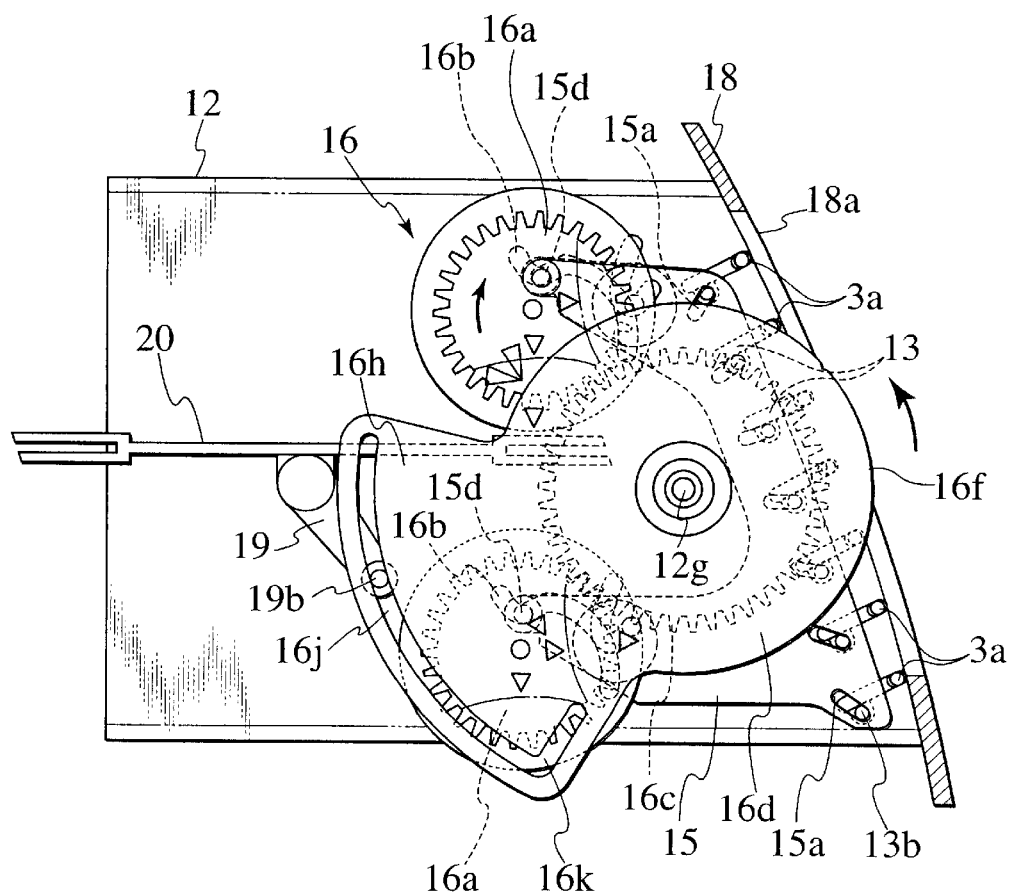
FIG. 21 is a function explanatory view showing a ventilator of the embodiment 2 of the present invention.

When the blowing out direction of the wind is to be adjusted to the upper direction, the operating portion 16f of the operation dial 16d is turned upward. With this, the slide link 15 is moved downward as shown in FIG. 21, and thus, the fins 13 connected to the slide link 15 via the connection pin 13b are turned counterclockwise around the shaft pin 13a. With this, the direction of the wind blown out from the air outlet is adjusted into an upward parallel wind.

Figure 22:
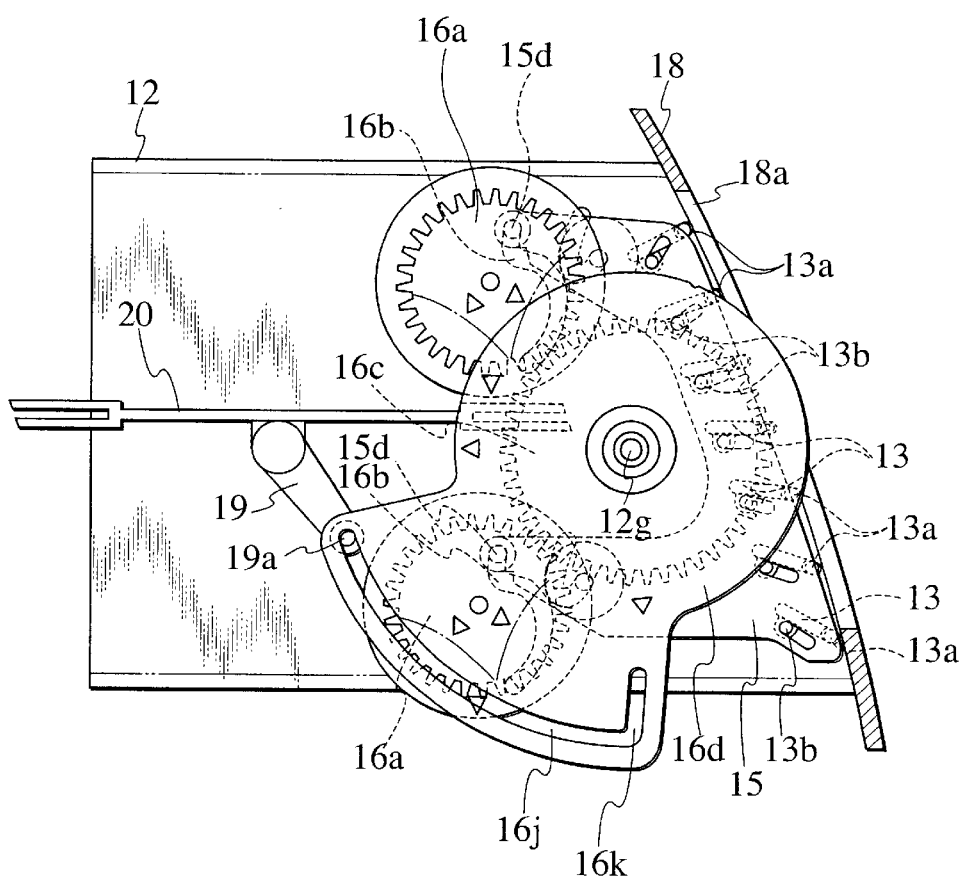
FIG. 22 is a function explanatory view showing a ventilator of the embodiment 2 of the present invention.

When the wind blown out from the air outlet is to be diffused such that the wind is blown out toward a passenger, the operating portion 16f is further turned upward to select the specific mode. With this, since the pinion 16c rotates the intermediate gear 16a in a clockwise direction, the slide link 15 is moved forward toward a position shown in FIG. 22 by one end of the cam groove 16b. The fins 13 at an intermediate position are held horizontally by the guide hole 15a of the slide link 15, the fins 13 located above the intermediate position are turned counterclockwise and turned upward, and the fins 13 located below the intermediate position are turned clockwise and turned downward. The wind blown out from the air outlet is diffused by the fins 13 and blown out toward the passenger.

Figure 23:
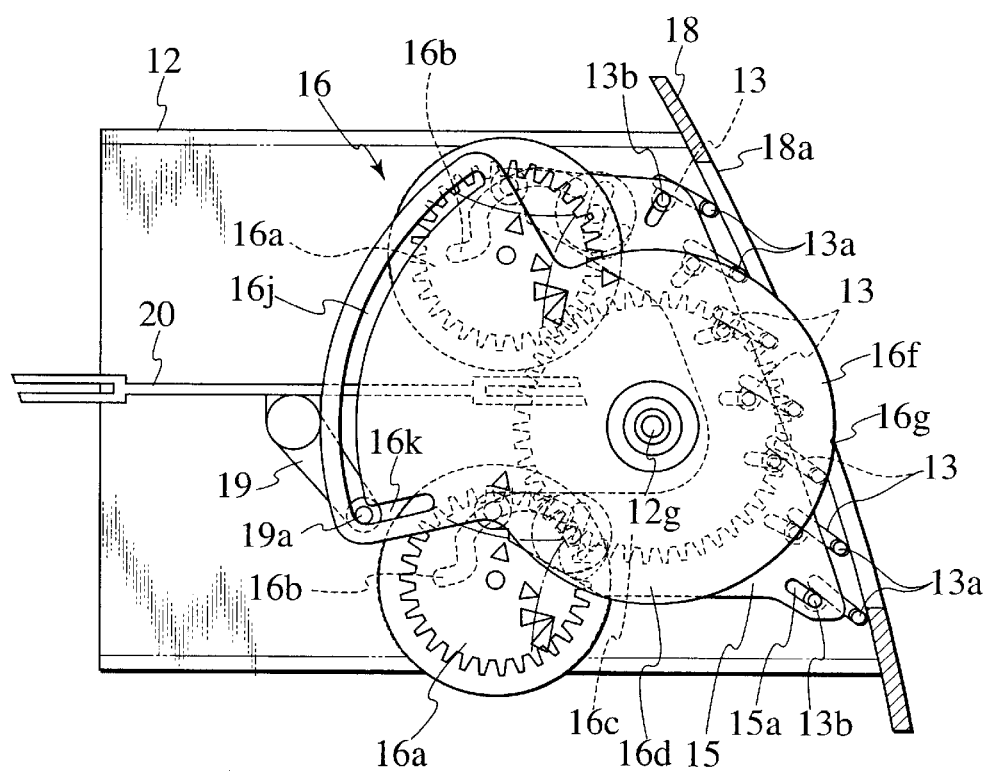
FIG. 23 is a function explanatory view showing a ventilator of the embodiment 2 of the present invention.

When the wind blowing out direction is to be adjusted downward from the normal mode shown in FIG. 20, the operating portion 16f is turned downward. With this, the slide link 15 is moved upward as shown in FIG. 23. Therefore, the fins 13 connected to the slide link 15 via the connection pin 13b are turned clockwise around the shaft pin 13b. Thus, the wind blown out from the air outlet is adjusted into a downward parallel wind.

Figure 24:
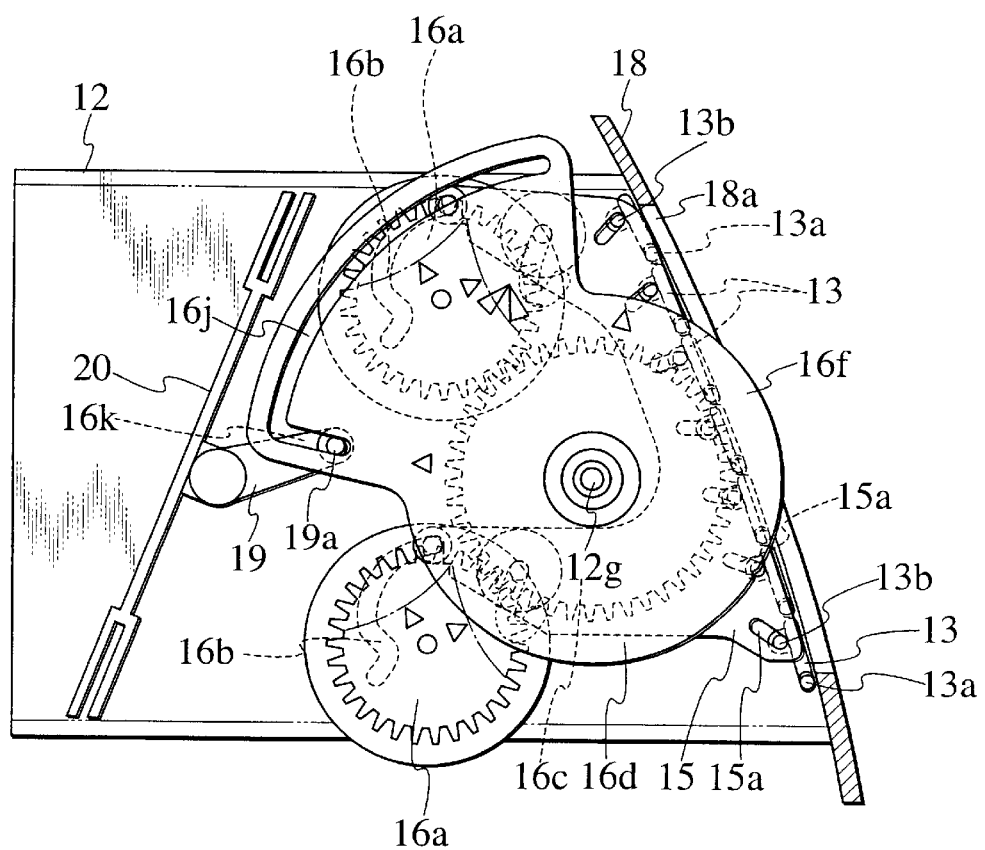
FIG. 24 is a function explanatory view showing a ventilator of the embodiment 2 of the present invention.

When the wind blown out from the air outlet is to be cut off, the operating portion 16f is further turned downward. With this operation, the slide link 15 is moved to a shutting region, in which an air outlet is closed, in the mode selector 16. The operating portion 16f is further turned downward, so that the pinion 16c rotates the intermediate gear 16a in a counterclockwise direction. Accordingly, the slide link 15 is moved forward to a position shown in FIG. 25 by the other end of the cam groove 16b. Thus, as shown in FIG. 24, all the fins 13 are turned clockwise by the guide hole 15a, and the fins 13 are arranged on a surface along the curved surface of the finisher 18 to close the opening 18a of the finisher 18. At the same time, the pin 19a engaged with the cam 16j is moved toward a center of the operation dial 16d by the bent portion 16k of the cam 16j, thereby turning the shutter opening and closing lever 19 in a counterclockwise direction. Therefore, the shutter valve 20 closes the case 12, thereby substantially completely cutting off the wind blown out from the air outlet. Since the air outlet can be closed by each fins in this manner, an outer appearance of the ventilator when it is not used is enhanced. Further, selection of the specific mode and closing operation of the air outlet can be carried out only by changing the rotating direction by the single mode selector, and thus, operatability of the apparatus is excellent.

In the above embodiment, if the specific mode is selected by the mode selector 16, wind blown out from the air outlet is diffused. If the directions of the guide holes 15a formed in the slide link 15 are formed such that the guide hole 15a located on the intermediate position of the slide link 15 is substantially horizontal and the guide hole 15a located above the intermediate position is formed into a substantially U-shape, and the guide hole 15a located below the intermediate position is formed into a substantially reversed U-shape, the wind blown out from the air outlet can be intensively blown out toward a passenger when the specific mode is selected.

Figure 25:
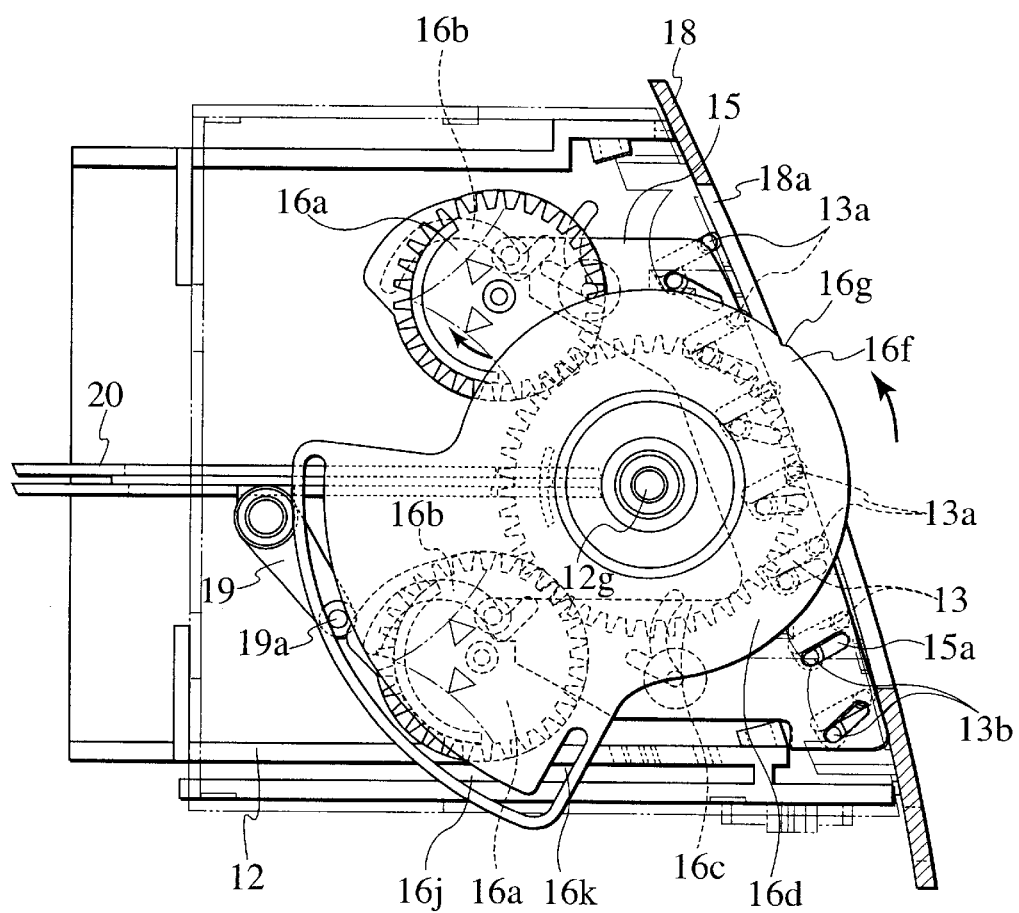
FIG. 25 is a function explanatory view showing a variational example of a ventilator of the embodiment 2 of the present invention.
Figure 26:
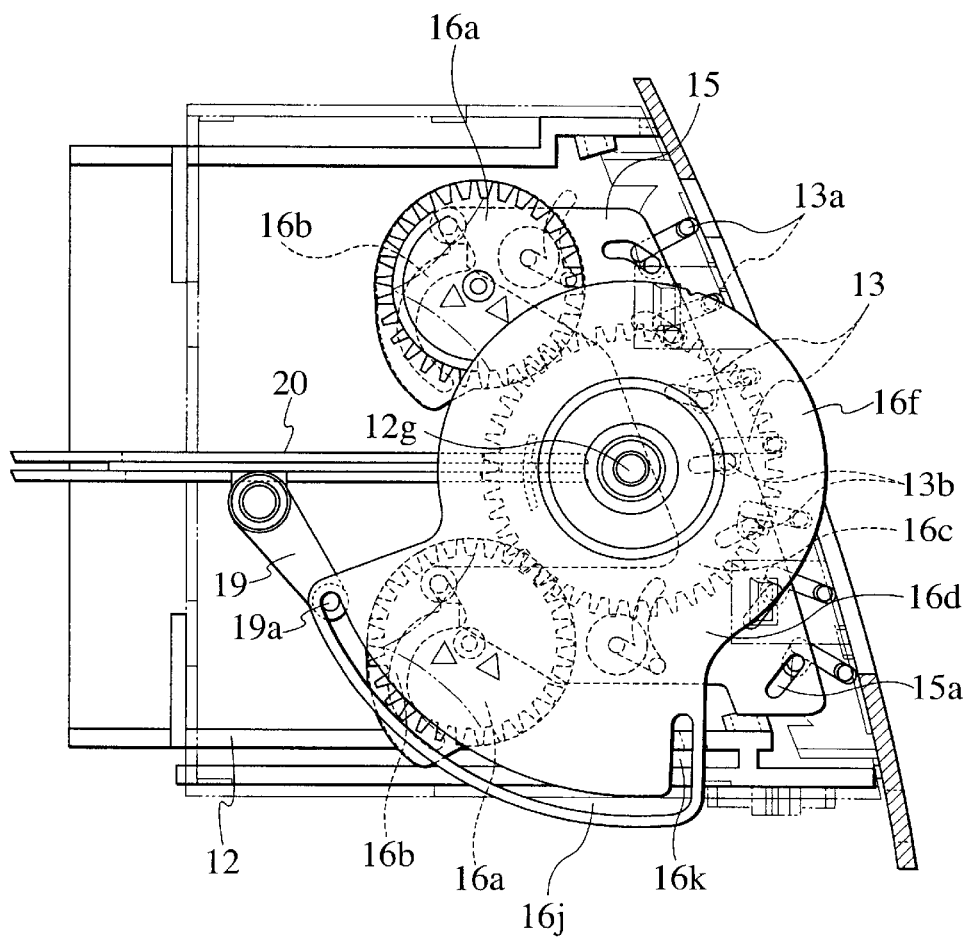
FIG. 26 is a function explanatory view showing a variational example of a ventilator of the embodiment 2 of the present invention.

As in the modification shown in FIG. 25 and FIG. 26, a direction of the cam groove 16b formed in the intermediate gear 16a may be set to be opposite to the above embodiment. In this case, if the parallel wind is adjusted upward as shown in FIG. 25, the slide link 15 reaches the forward end, and if the operation dial 15d is rotated upward, the slide link 15 is retreated as shown in FIG. 26. With this, the wind blown out from the air outlet is diffused.

Figure 27:
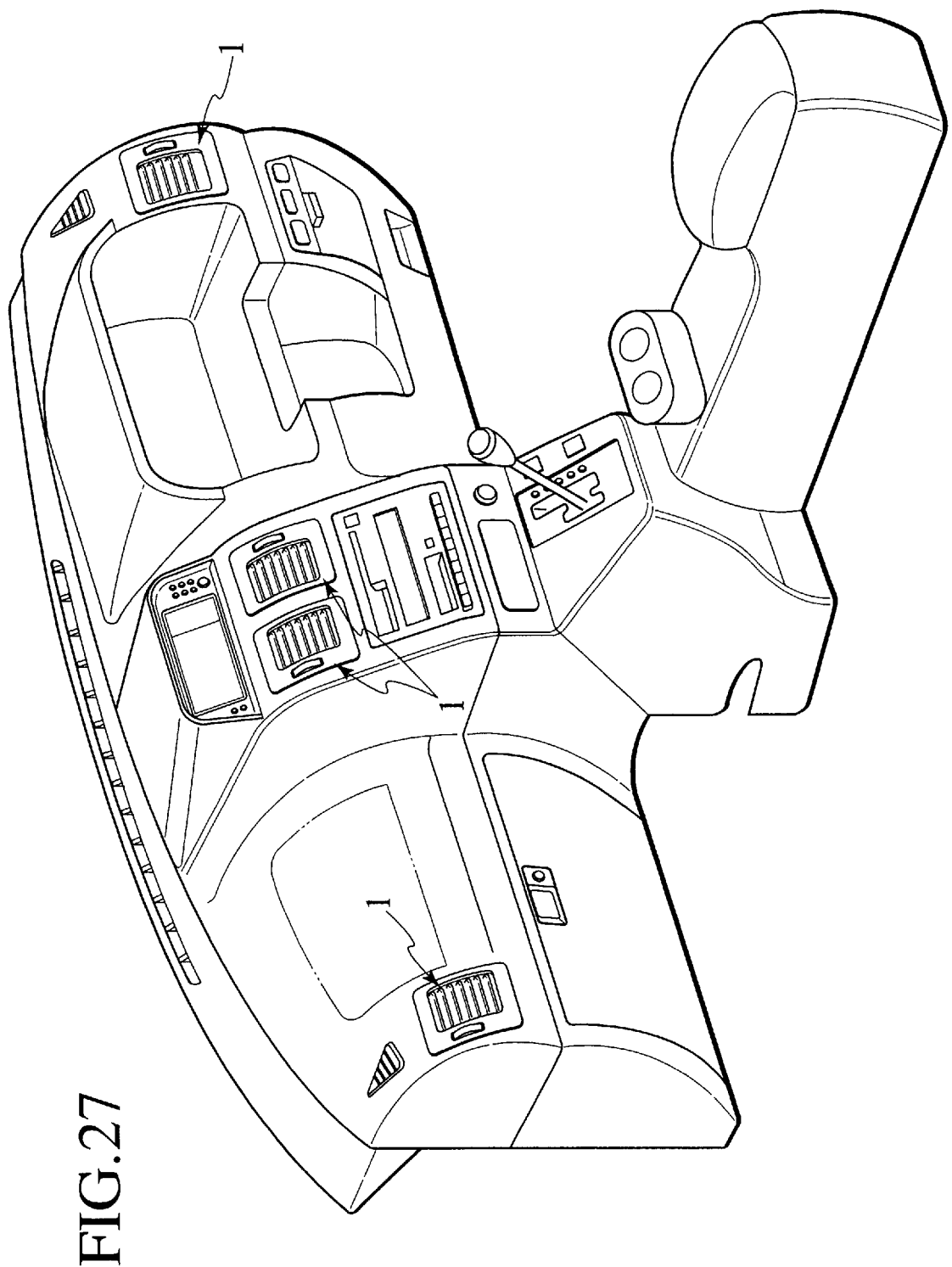
FIG. 27 is a perspective view showing an embodiment of a ventilator of the present invention.

Further, as shown in FIG. 27 as the embodiment of the present invention, if the ventilator of this invention is disposed on an upper portion of the instrument panel of the vehicle, the mode selector can easily be operated from a driver's seat or a passenger's seat and thus, operatability is enhanced. Since the wind blown out from the air outlet can be circulated over the entire compartment, the wind conditioning in the compartment can be carried out excellently.

The entire content of a Japanese Patent Application No. P2001-272226 filed on Sep. 7, 2001 and No. P2001-294436 filed on Sep. 26, 2001 is herein incorporated by reference.

Although the invention has been described above by reference to certain embodiments of the invention, the invention is not limited to the embodiments described above will occur to these skilled in the art, in light of the teachings. The scope of the invention is defined only by the following claims.

What is claimed is:

1. A ventilator for adjusting a wind direction, comprising:
 a case;
 a plurality of fins operatively associated with the case and being operated in a normal mode in which the wind direction is adjusted by turning the fins in parallel to each other, and in a specific mode in which the wind direction is collected or diffused; and
 a mode selector for continuously selecting the normal mode and the specific mode,
 wherein the mode selector has a normal operating region and a specific operating region,
 the normal mode is performed in the normal operating region and the specific mode is performed in the specific operating regions,
 the mode selector comprises an operation member, an intermediate gear which is rotated by the operation member, and a slide link which is engaged with a cam groove formed on the intermediate gear and is moved in a cross direction,
 the slide link is moved from the normal operating region to the specific operating region via the intermediate gear such that the normal mode and the specific mode are continuously selected, and
 the cam groove is formed into a substantially J-shape.

2. A ventilator according to claim 1,
 wherein the specific operating region is provided next to the normal operating region.

3. A ventilator according to claim 1,
 wherein the operation member is an operation dial.

4. A ventilator according to claim 1,
 wherein a portion of the operation member is projected from a front surface of a finisher mounted to an opening of the case.

5. A ventilator according to claim 1,
 wherein a connection pin projected on the fin is engaged with a guide hole formed in the slide link such that the slide link and the fins are interlocked with each other.

6. A ventilator for adjusting a wind direction, comprising:
 a case;
 a plurality of fins being operated in a normal mode in which the wind direction is adjusted by turning the fins in parallel to each other, and in a specific mode in which the wind direction is collected or diffused; and
 a mode selector for continuously selecting the normal mode and the specific mode, wherein the mode selector has a normal operating region and a specific operating region, the normal mode is performed in the normal operating region and the specific mode is performed in the specific operating region, the mode selector comprises an operation dial, an intermediate gear which is rotated by the operation dial, and a slide link which is engaged with a cam groove formed on the intermediate gear and is moved in a cross direction, the slide link is moved from the normal operating region to the specific operating region via the intermediate gear such that the normal mode and the specific mode are continuously selected, and the cam groove comprises a plurality of arc portions opposed to each other with respect to a center of the intermediate gear, a bent portion formed by bending one end of the arc portions toward the center of the intermediate gear, and a substantially trapezoidal merging portion formed by merging the other end of the arc portions.

7. A ventilator for adjusting a wind direction, comprising:

a case;

a plurality of fins being operated in a normal mode in which the wind direction is adjusted by turning the fins in parallel to each other, and in a specific mode in which the wind direction is collected or diffused; and a mode selector for continuously selecting the normal mode and the specific mode, wherein the mode selector has a normal operating region and a specific operating region, the normal mode is performed in the normal operating region and the specific mode is performed in the specific operating region, the mode selector comprises an operation dial, an intermediate gear which is rotated by the operation dial, and a slide link which is engaged with a cam groove formed on the intermediate gear and is moved in a cross direction, the slide link is moved from the normal operating region to the specific operating region via the intermediate gear such that the normal mode and the specific mode are continuously selected, and the cam groove is formed into a substantially J-shape including an arc portion and a straight portion.

8. A ventilator for adjusting a wind direction, comprising:

a case;

a plurality of fins being operated in a normal mode in which the wind direction is adjusted by turning the fins in parallel to each other, and in a specific mode in which the wind direction is collected or diffused; and a mode selector for continuously selecting the normal mode and the specific mode, wherein the mode selector has a normal operating region and a specific operating region, the normal mode is performed in the normal operating region and the specific mode is performed in the specific operating region, the mode selector comprises an operation dial, an intermediate gear which is rotated by the operation dial, and a slide link which is engaged with a cam groove formed on the intermediate gear and is moved in a cross direction, the slide link is moved from the normal operating region to the specific operating region via the intermediate gear such that the normal mode and the specific mode are continuously selected, the cam groove comprises a first cam groove which is formed into a substantially J-shape including a first arc portion and a straight portion, and a second cam groove including a second arc portion and a bent portion formed by bending one end of the second arc portion toward a center of the intermediate gear, and the first cam groove and the second cam groove are opposed to each other with respect to the center of the intermediate gear.

9. A ventilator for adjusting a wind direction, comprising:

a case;

a plurality of fins being operated in a normal mode in which the wind direction is adjusted by turning the fins in parallel to each other, and in a specific mode in which the wind direction is collected or diffused; and a mode selector for continuously selecting the normal mode and the specific mode, wherein the mode selector has a normal operating region and a specific operating region, the normal mode is performed in the normal operating region and the specific mode is performed in the specific operating region, the mode selector comprises an operation dial, an intermediate gear which is rotated by the operation dial, and a slide link which is engaged with a cam groove formed on the intermediate gear and is moved in a cross direction, the slide link is moved from the normal operating region to the specific operating region via the intermediate gear such that the normal mode and the specific mode are continuously selected, and the cam groove comprises a plurality of grooves which are opposed to each other with respect to a center of the intermediate gear and are formed into a substantially J-shape including an arc portion and a straight portion, and a merging portion formed by merging one end of the grooves.

10. A ventilator according to claim 1, wherein the operating member is an operating knob.

11. A ventilator according to claim 10, wherein the operation knob includes a guide groove, the intermediate gear has a pin which is inserted into the guide groove, and an operation force applied to the operation knob is converted into a rotation force of the intermediate gear via the guide groove and the pin.

12. A ventilator according to claim 10, wherein the operation knob has a rack, and the intermediate gear has a pinion which is engaged with the rack, and an operation force applied to the operation knob is converted into a rotation force of the intermediate gear via the rack and the pinion.

13. A ventilator according to claim 1, wherein the mode selector has a shutting region in which an air outlet is closed to turn the fins such that an edge of the fin is opposed to an edge of the adjacent fin.

14. A ventilator according to claim 13, wherein the mode selector is turned into one direction from the normal mode such that the air outlet is closed, and the mode selector is turned into the other direction from the normal mode such that the specific mode is selected.

15. A ventilator for adjusting a wind direction, comprising:

a case a plurality of fins being operated in a normal mode in which the wind direction is adjusted by turning the fins in parallel to each other, and in a specific mode in which the wind direction is collected or diffused; and a mode selector for continuously selecting the normal mode and the specific mode, wherein the mode selector has a normal operating region and a specific operating region, the normal mode is performed in the normal operating region and the specific mode is performed in the specific operating region, the mode selector has a shutting region in which an air outlet is closed to turn the fins such that an edge of the fin is opposed to an edge of the adjacent fin, and a shutter valve cooperating with the fins to close in the case when the air outlet is closed by the fins is provided in the case such that the shutter valve is opened and closed.

16. A ventilator according to claim 15, wherein the mode selector comprises an operation dial, an intermediate gear which is rotated by the operation dial, and a slide link which is engaged with a cam groove formed on the intermediate gear and is moved in a cross direction, the operation dial includes an opening and closing cam which is connected to the shutter valve, and an operation force given to the operation dial is converted into an opening and closing force of the shutter valve via the opening and closing cam.

17. A ventilator according to claim 16, wherein the opening and closing cam is set to a fan-like shape, and an opening and closing cam groove is formed in the opening and closing cam, an opening and closing pin connected to the shutter valve is engaged to the opening and closing cam groove, so that the shutter valve and the operation dial cooperate with each other.

18. A ventilator according to claim 1, wherein the case is disposed on an upper portion of an instrument panel.

\* \* \* \* \*